(12) United States Patent
Oda et al.

(10) Patent No.: US 12,345,902 B2
(45) Date of Patent: Jul. 1, 2025

(54) OPTICAL DEVICE AND METHOD OF PRODUCING OPTICAL DEVICE

(71) Applicant: TOPPAN INC., Tokyo (JP)

(72) Inventors: Yukari Oda, Tokyo (JP); Masashi Kawashita, Tokyo (JP); Yoshiko Ishimaru, Tokyo (JP); Azusa Yamagishi, Tokyo (JP)

(73) Assignee: TOPPAN INC., Tokyo (JP)

( * ) Notice: Subject to any disclaimer, the term of this patent is extended or adjusted under 35 U.S.C. 154(b) by 405 days.

(21) Appl. No.: 17/881,902

(22) Filed: Aug. 5, 2022

(65) Prior Publication Data

US 2022/0381973 A1 Dec. 1, 2022

Related U.S. Application Data

(63) Continuation of application No. PCT/JP2021/004369, filed on Feb. 5, 2021.

(30) Foreign Application Priority Data

Feb. 7, 2020 (JP) .................................. 2020-020046

(51) Int. Cl.
  *G02B 5/18* (2006.01)
  *G02B 5/22* (2006.01)
  *G02B 5/28* (2006.01)

(52) U.S. Cl.
  CPC ......... *G02B 5/1847* (2013.01); *G02B 5/1809* (2013.01); *G02B 5/1866* (2013.01); *G02B 5/22* (2013.01); *G02B 5/28* (2013.01)

(58) Field of Classification Search
  CPC .. G02B 5/1847; G02B 5/1809; G02B 5/1866; G02B 5/22; G02B 5/28; G02B 5/285; G02B 5/288; G01J 3/26
  See application file for complete search history.

(56) References Cited

U.S. PATENT DOCUMENTS

| | | | |
|---|---|---|---|
| 2003/0027328 A1* | 2/2003 | Cunningham | G01N 21/7743 435/7.9 |
| 2017/0205547 A1 | 7/2017 | Lochbihler | |
| 2022/0019009 A1* | 1/2022 | Edwards | B32B 7/12 |

FOREIGN PATENT DOCUMENTS

| | | |
|---|---|---|
| DE | 10 2017 003 532 A1 | 10/2018 |
| JP | 2009-025558 A | 2/2009 |

(Continued)

OTHER PUBLICATIONS

Yoshimura, English translation for WO-2018131665-A1 (Year: 2018).*

(Continued)

*Primary Examiner* — Jonathan Y Jung
(74) *Attorney, Agent, or Firm* — Foley & Lardner LLP

(57) ABSTRACT

An optical device includes a concave-convex structure layer having a concavo-convex structure on a surface thereof, the concavo-convex structure formed of a plurality of convexities or a plurality of concavities which are arranged with a sub-wavelength period, a high refractive index layer made of a material having a refractive index higher than that of the concavo-convex structure layer and located on the concavo-convex structure while having a surface conforming to the concavo-convex structure, and a low refractive index layer made of a material having a refractive index lower than that of the high refractive index layer and located on the high refractive index layer. The high refractive layer includes first grating high refractive index portions located at a bottom of the concavo-convex structure to form a first sub-wavelength grating, and second grating high refractive index portions located at a top of the concavo-convex structure to form a second sub-wavelength grating.

10 Claims, 10 Drawing Sheets

(56) References Cited

FOREIGN PATENT DOCUMENTS

| JP | 2010-122227 A | 6/2010 | | |
|---|---|---|---|---|
| JP | 5023324 B2 | 9/2012 | | |
| JP | 2018-063304 A | 4/2018 | | |
| WO | WO-2018070431 A1 * | 4/2018 | ............. | B42D 25/30 |
| WO | WO-2018131665 A1 * | 7/2018 | ............... | B32B 3/30 |

OTHER PUBLICATIONS

Kawashita, English translation for WO-2018070431-A1 (Year: 2018).*
Extended European Search Report issued in connection with EP Appl. Ser. No. 21751415.7 dated Jul. 7, 2023.
International Searching Authority, "International Search Report," issued in connection with International Patent Application No. PCT/JP2021/004369, dated Apr. 6, 2021, 5 pages.
International Searching Authority, "Written Opinion," issued in connection with International Patent Application No. PCT/JP2020/004369, dated Apr. 6, 2021, 4 pages.

* cited by examiner

OPTICAL DEVICE AND METHOD OF PRODUCING OPTICAL DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/004369, filed on Feb. 5, 2021, which in turn claims the benefit of JP 2020-020046, filed Feb. 7, 2020 the disclosures of all which are incorporated herein by reference in its entirety.

Technical Field

The present invention relates to optical devices using a guided mode resonance phenomenon, and methods of producing optical devices.

BACKGROUND

Optical devices that extract light in a specific wavelength range, as transmitted light or reflected light, from incident light, are used as wavelength selective filters such as color filters which extract light of red, green and blue colors from incident light. For example, filters having a structure of passing a relatively large amount of light in a specific wavelength range using absorption properties of dyes or the like, are widely used. Also, optical devices using a guided mode resonance phenomenon are available as another type of filters achieving higher wavelength selectivity than the filters using absorption properties of dyes. Such optical devices have a sub-wavelength grating that is a diffraction grating having a period shorter than that of the wavelength of light. When light is incident on this sub-wavelength grating, light in a specific wavelength range undergoes resonance while being multiply reflected, due to the difference in refractive index or the like from the surrounding, and emerges as enhanced reflected light. Thus, of the incident light, light in the wavelength range excluding the wavelength range of the reflected light emerges from the optical device as transmitted light (e.g., see PTLs 1 and 2).

[Citation List] [Patent Literature] PTL 1: JP 5023324 B; PTL 2: JP 2009-25558 A.

SUMMARY OF THE INVENTION

Technical Problem

In order to increase application of optical devices, it is preferred that the optical devices have a light shielding function in addition to the function of selectively reflecting and transmitting light.

For example, LED displays using micro-LEDs are receiving attention as next-generation displays. In a type of such LED displays, light from ultraviolet LEDs (UV-LEDs) is applied to a wavelength conversion layer made of a phosphor so that the phosphor is excited and outputs colored light. Specifically, the wavelength conversion layer includes sub-pixel regions outputting red light, sub-pixel regions outputting green light, and sub-pixel regions outputting blue light. A plurality of LEDs are arrayed conforming to the array of the sub-pixel regions, and UV light emitted from the LEDs is applied to the respective sub-pixel regions, so that light of respective colors with intensities according to the intensity of the UV light emerges from the sub-pixel regions. Thus, a color image can be displayed on the LED display.

It should be noted that part of the UV light emitted from the LEDs passes through the wavelength conversion layer and leaks to the surface of the LED display. To eye protection of the viewer of LED displays, it is preferred that there is little leakage of UV light from the LED displays. If optical devices have a UV light shielding function in addition to the colored light transmitting function, such optical devices can also be used for minimizing leakage of UV light, and thus application of the optical devices increases.

The present disclosure aims to provide an optical device having a light shielding function, and a method of producing an optical device.

Solution to Problem

In an aspect, an optical device is provided. The optical device includes a concave-convex structure layer having a concavo-convex structure on a surface thereof, the concavo-convex structure being formed of either a plurality of convexities or a plurality of concavities which are arranged with a sub-wavelength period; a high refractive index layer located on the concavo-convex structure and having a surface conforming to the concavo-convex structure, the high refractive index layer including first grating high refractive index portions located at a bottom of the concavo-convex structure and forming a first sub-wavelength grating and second grating high refractive index portions located at a top of the concavo-convex structure and forming a second sub-wavelength grating, the high refractive index layer being made of a material having a refractive index higher than that of the concavo-convex structure layer; and a low refractive index layer located on the high refractive index layer and made of a material having a refractive index lower than that of the high refractive index layer. Either of the concavo-convex structure layer and the low refractive index layer has absorptivity for light in a predetermined wavelength range; or the optical device includes an additional layer having absorptivity for light in the predetermined wavelength range.

In another aspect, a method of producing an optical device is provided. The method of producing an optical device includes a first step of forming a concave-convex structure layer made of a first low refractive index material and having a concavo-convex structure on a surface thereof, the concavo-convex structure being formed of either a plurality of convexities or a plurality of concavities which are arranged with a sub-wavelength period; a second step of forming a high refractive index layer made of a high refractive index material having a refractive index higher than that of the first low refractive index material, the high refractive index layer conforming to a surface of the concavo-convex structure, and including first grating high refractive index portions located at a bottom of the concavo-convex structure and forming a first sub-wavelength grating and second grating high refractive index portions located at a top of the concavo-convex structure and forming a second sub-wavelength grating; and a third step of forming a low refractive index layer on the high refractive index layer, the low refractive index layer being made of a second low refractive index material having a refractive index lower than that of the high refractive index material. Either of the concavo-convex structure layer and the low refractive index layer has absorptivity for light in a predetermined wavelength range;

or the method includes a step of forming an additional layer having absorptivity for light in the predetermined wavelength range.

BRIEF DESCRIPTION OF THE DRAWINGS

FIGS. 1A-1D are a set of diagrams illustrating a first embodiment of an optical device, in which FIG. 1A is a diagram illustrating a cross-sectional structure of the optical device, FIG. 1B is a diagram illustrating a cross-sectional structure of a first grating region, FIG. 1C is a diagram illustrating a cross-sectional structure of an intermediate region, and FIG. 1D is a diagram illustrating a cross-sectional structure of a second grating region.

FIGS. 14A-14D are a set of diagrams illustrating a fourth embodiment of an optical device, in which FIG. 14A is a diagram illustrating a cross-sectional structure of the optical device, FIG. 14B is a diagram illustrating a cross-sectional structure of a first grating region, FIG. 14C is a diagram illustrating a cross-sectional structure of an intermediate region, and FIG. 14D is a diagram illustrating a cross-sectional structure of a second grating region.

DETAILED DESCRIPTION

Figure 1A:
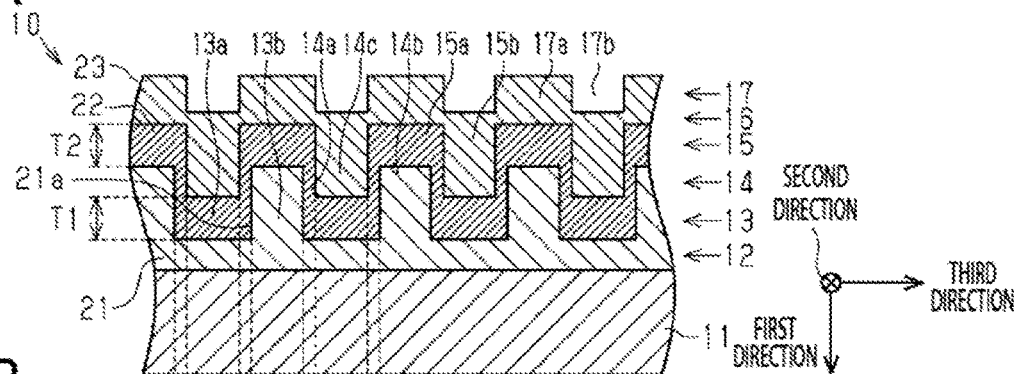

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

First Embodiment

Referring to FIGS. 1A to 8, a first embodiment of an optical device and a method of producing an optical device will be described. The present embodiment will be described taking as an example an optical device having a light shielding function in the ultraviolet (UV) region. In the following description, the wavelength of light in the visible region is taken to be 400 nm or more and 800 nm or less, and the wavelength of light in the UV region is taken to be 300 nm or more and less than 400 nm.

[Overall Configuration of Optical Device]

Figure 1B:
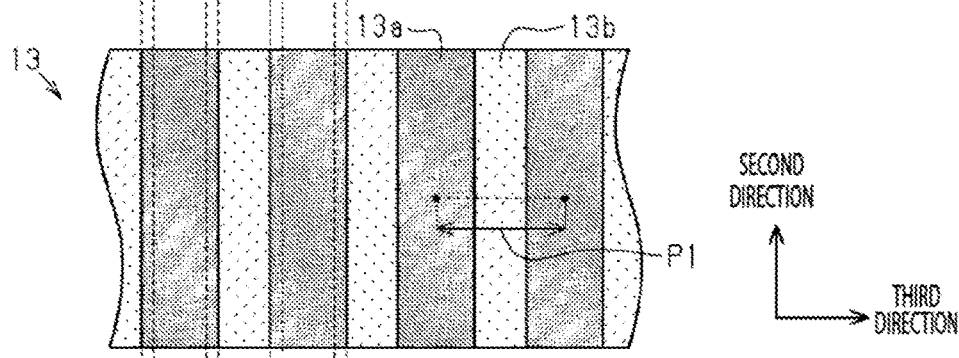
Figure 1C:
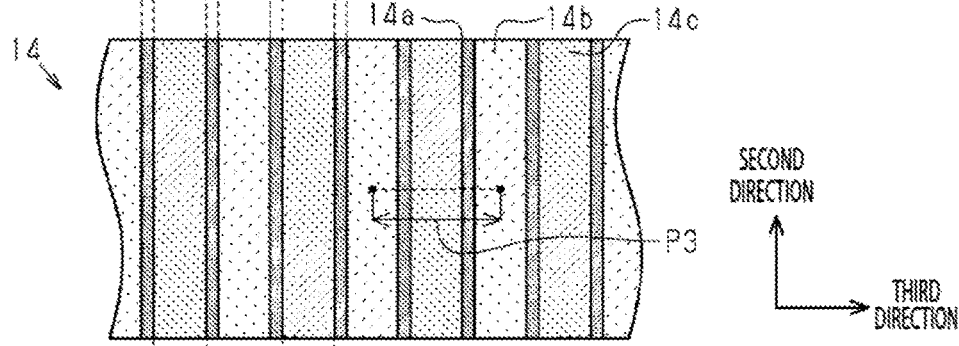
Figure 1D:
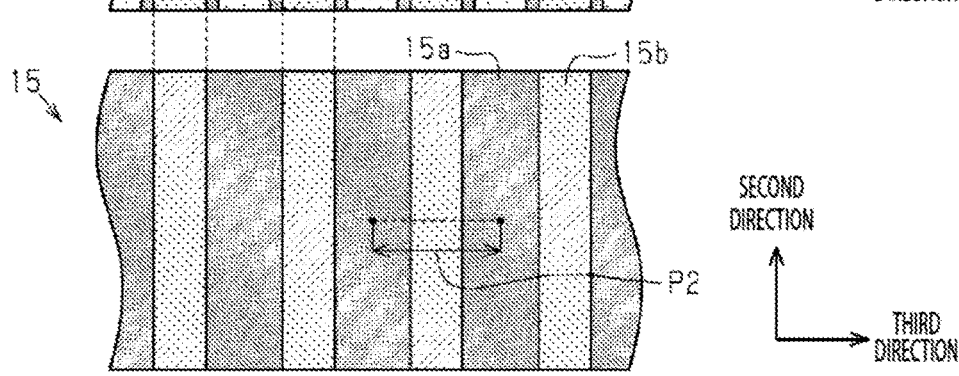

As shown in FIG. 1A, an optical device 10 includes a substrate 11, a first low refractive index region 12, a first grating region 13, an intermediate region 14, a second grating region 15, a second low refractive index region 16, and a top region 17. These regions are spread out in layers in which the first low refractive index region 12, the first grating region 13, the intermediate region 14, the second grating region 15, the second low refractive index region 16, and the top region 17 are arranged in this order from the position near the substrate 11. The direction in which the regions are arranged is a first direction which, in other words, is a thickness direction of the regions and the optical device 10. Also, the side where the top region 17 is located with respect to the substrate 11 is the front side of the optical device 10, and the side where the substrate 11 is located with respect to the top region 17 is the rear side of the optical device 10. FIG. 1B shows a cross section of the first grating region 13 orthogonal to the first direction, FIG. 1C shows a cross section of the intermediate region 14 orthogonal to the first direction, and FIG. 1D shows a cross section of the second grating region 15 orthogonal to the first direction.

The substrate 11 has a plate shape and, of the surfaces of the substrate 11, the surface which is located at the front side of the optical device 10 is the front surface of the substrate 11. The substrate 11 is made of a material which does not have an absorption wavelength in the wavelength range desired to be extracted in the optical device 10. For example, if light in the visible region is extracted as transmitted light, a substrate which is transparent to light in the visible region is used as the substrate 11, such as a synthetic quartz substrate or a film made of a resin such as polyethylene terephthalate or polyethylene naphthalate.

The first low refractive index region 12 is in contact with the front surface of the substrate 11 and uniformly spread over the front surface of the substrate 11. The first grating region 13 includes first grating high refractive index portions 13a and first grating low refractive index portions 13b. As viewed perpendicularly to the front surface of the substrate 11, i.e., as viewed in the first direction, the first grating high refractive index portions 13a and the first grating low refractive index portions 13b both extend in strips in a second direction, while alternating in a third direction orthogonal to the second direction. The second and third directions are orthogonal to the first direction.

The intermediate region 14 includes intermediate high refractive index portions 14a, first intermediate low refractive index portions 14b, and second intermediate low refractive index portions 14c. As viewed in the first direction, these portions extend in the second direction, while the first and second intermediate low refractive index portions 14b and 14c alternate in the third direction with the intermediate high refractive index portions 14a being each sandwiched therebetween. In other words, the first intermediate low refractive index portion 14b, the intermediate high refractive index portion 14a, the second intermediate low refractive index portion 14c, and the intermediate high refractive index portion 14a are repeatedly arranged in this order in the third direction. The first intermediate low refractive index portions 14b are located on the respective first grating low refractive index portions 13b. The intermediate high refractive index portions 14a are located on respective peripheral portions of the first grating high refractive index portions 13a in the width direction, and the second intermediate low refractive index portions 14c are located on respective center portions of the first grating high refractive index portions 13a in the width direction.

The second grating region 15 includes second grating high refractive index portions 15a and second grating low refractive index portions 15b. As viewed in the first direction, the second grating high refractive index portions 15a and the second grating low refractive index portions 15b extend in strips in the second direction, while alternating in the third direction. Specifically, in the two grating regions 13 and 15, the high refractive index portions and the low refractive index portions are arrayed in the same direction. The second grating high refractive index portions 15a are located on the respective first intermediate low refractive index portions 14b and the intermediate high refractive index portions 14a, and the second grating low refractive index portions 15b are located on the respective second intermediate low refractive index portions 14c.

The second low refractive index region 16 is on the opposite side of the second grating region 15 to that facing the intermediate region 14, and is uniformly spread over the second grating region 15. The top region 17 includes first top low refractive index portions 17a and second top low refractive index portions 17b. As viewed in the first direction, the first and second top low refractive index portions 17a and 17b extend in strips in the second direction, while alternating in the third direction. The first top low refractive index portions 17a are located on the respective second grating high refractive index portions 15a via the second low refractive index region 16, and the second top low refractive index portions 17b are located on the respective second grating low refractive index portions 15b via the second low refractive index region 16.

The regions of the optical device 10 adjacent to each other in the first direction are continuous in part thereof. Specifically, the first low refractive index region 12 is continuous with the first grating low refractive index portions 13b which are continuous with the first intermediate low refractive index portions 14b, all of which are formed of the same material. Also, the first grating high refractive index portions 13a are continuous with the intermediate high refractive index portions 14a which are continuous with the second grating high refractive index portions 15a, all of which are formed of the same material. Furthermore, the second intermediate low refractive index portions 14c are continuous with the second grating low refractive index portions 15b which are continuous with the second low refractive index region 16 which is further continuous with the first top low refractive index portions 17a, all of which are formed of the same material. The second top low refractive portions 17b contain air.

Specifically, the optical device 10 can be regarded as a structure including the substrate 11, a concavo-convex structure layer 21 located on the substrate 11 and having a concavo-convex structure formed of a plurality of convexities 21a, a high refractive index layer 22 located parallel to the surface of the concavo-convex structure layer 21, and a low refractive index layer 23 located parallel to the surface of the high refractive index layer 22. The plurality of convexities 21a extend in the second direction and are arranged in the third direction. The high refractive index layer 22 has a surface conforming to the asperities of the concavo-convex structure layer 21, while the low refractive index layer 23 has a surface conforming to the asperities of the high refractive index layer 22.

The concavo-convex structure layer 21 includes the first low refractive index region 12, the first grating low refractive index portions 13b, and the first intermediate low refractive index portions 14b. Each convexity 21a includes a corresponding one of the first grating low refractive index portions 13b and a corresponding one of the first intermediate low refractive index portions 14b.

The high refractive index layer 22 includes the first grating high refractive index portions 13a, the intermediate high refractive index portions 14a, and the second grating high refractive index portions 15a. The first grating high refractive index portions 13a are each located between the convexities 21a, i.e., located at the bottom of the concavo-convex structure of the concavo-convex structure layer 21. The intermediate high refractive index portions 14a are in contact with side faces of the convexities 21a, and each extend in the thickness direction of the intermediate region 14, while connecting between peripheral portions of the first grating high refractive index portion 13a and the second grating high refractive index portion 15a adjacent to each other as viewed in the first direction. The second grating high refractive index portions 15a cover the top faces of the respective convexities 21a, i.e., are located at the top of the concavo-convex structure of the concavo-convex structure layer 21.

The low refractive index layer 23 includes the second intermediate low refractive index portions 14c, the second grating low refractive index portions 15b, the second low refractive index region 16, and the first top low refractive index portions 17a. The low refractive index layer 23 has a shape in which the second intermediate low refractive index portions 14c and the second grating low refractive index portions 15b protrude downward from the second low refractive index region 16 toward the substrate 11, and the first top low refractive index portions 17a protrude upward from the second low refractive index region 16 in the direction opposite to the substrate 11. The surface of the low refractive index layer 23 has asperities where the second top low refractive index portions 17b correspond to the concavities.

The material of the high refractive index layer 22 has a refractive index that is higher than that of air and also higher than those of the materials of the concavo-convex structure layer 21 and the low refractive index layer 23. Specifically, the refractive indices of the first grating high refractive index portions 13a, the intermediate high refractive index portions 14a, and the second grating high refractive index portions 15a are higher than those of the first low refractive index region 12, the first grating low refractive index portions 13b, the first intermediate low refractive index portions 14b, the second intermediate low refractive index portions 14c, the second grating low refractive index portions 15b, the second low refractive index region 16, the first top low refractive index portions 17a, and the second top low refractive index portions 17b.

The refractive indices of the materials of the concavo-convex structure layer 21 and the low refractive index layer 23 are higher than the refractive index of air. In order to preferably cause a guided mode resonance phenomenon, it is preferred that the difference in refractive index is large between the material of each of the concavo-convex structure layer 21 and the low refractive index layer 23 and the material of the high refractive index layer 22, and it is also preferred that the difference in refractive index between the material of each of the concavo-convex structure layer 21 and the low refractive index layer 23 and the material of the high refractive index layer 22 is larger than the difference in refractive index between the material of the concavo-convex structure layer 21 and the material of the low refractive index layer 23. Furthermore, it is preferred the refractive index of the material of the low refractive index layer 23 adjacent to the air layer is equal to or lower than the refractive index of the material of the concavo-convex structure layer 21.

The concavo-convex structure layer 21, the high refractive index layer 22, and the low refractive index layer 23 are made of materials which do not have an absorption wavelength in the wavelength range desired to be extracted in the optical device 10. For example, when extracting light in the visible region as transmitted light, the concavo-convex structure layer 21, the high refractive index layer 22, and the low refractive index layer 23 are each made of a material transparent to light in the visible region. Furthermore, the low refractive index layer 23 is made of a material having an absorption wavelength in the UV region, i.e., a material absorbing UV light.

Specifically, as a low refractive index material of the concavo-convex structure layer 21, an inorganic material such as synthetic quartz, or a resin material such as a UV curable resin, thermoplastic resin, or thermosetting resin can be used. Also, as a low refractive index material of the low refractive index layer 23, an epoxy resin, zinc oxide, or the like can be used. Furthermore, as a high refractive index material of the high refractive index layer 22, an inorganic compound material such as titanium oxide, niobium oxide, tantalum oxide, zirconium oxide, zinc sulfide, indium tin oxide, or aluminum nitride can be used.

[Operation of Optical Device]

The period of the grating structure, i.e., the array period of the first grating high refractive index portions 13a, as a first period P1, in the first grating region 13 is shorter than the wavelength of light incident on the optical device 10. Similarly, the period of the grating structure, i.e., the array period of the second grating high refractive index portions 15a, as a second period P2, in the second grating region 15 is shorter than the wavelength of light incident on the optical device 10. Specifically, the first period P1 and the second period P2 are sub-wavelength periods and accordingly the first grating region 13 and the second grating region 15 include respective sub-wavelength gratings. The wavelength range of incident light, which is the target of the optical device 10 of the present embodiment, is a region including a UV region and a visible region, i.e., a region that is 300 nm or more and 800 nm or less.

The average refractive index in each region in the optical device 10 is approximated to a value as a result of averaging the refractive index of the high refractive index portions and that of the low refractive index portions, in proportion to the volume ratio between the high refractive index portions and the low refractive index portions in the region. The ratio of the intermediate high refractive index portions 14a in the intermediate region 14 is smaller than the ratio of the first grating high refractive index portions 13a in the first grating region 13 and the ratio of the second grating high refractive index portions 15a in the second grating region 15. Accordingly, the average refractive index of the intermediate region 14 is smaller than the average refractive index of the first grating region 13 and the average refractive index of the second grating region 15. Specifically, the optical device 10 has a structure in which the sub-wavelength gradings located in the first and second grating regions 13 and 15 are embedded in the respective regions with low refractive indices.

When light is incident on the optical device 10 from the front side, diffracted light emerging from the front side is minimized in the second grating region 15 due to the sub-wavelength grating thereof being embedded in the low refractive index region, and thus a guided mode resonance phenomenon is produced. Specifically, light in a specific wavelength range undergoes resonance while propagating through the second grating region 15 with multiple reflection, and emerges the front side of the optical device 10 as reflected light.

The light that has passed through the second grating region 15 and has further passed through the intermediate region 14 enters the first grating region 13. When light is incident on the first grating region 13, a guided mode resonance phenomenon is also produced in the first grating region 13 due to the sub-wavelength grating thereof being embedded in the low refractive index region. Specifically, light in a specific wavelength range undergoes resonance while propagating through the first grating region 13 with multiple reflection, and emerges from the front side of the optical device 10 as reflected light.

The light that has passed through the first grating region 13 passes through the first low refractive index region 12 and the substrate 11 and is outputted to the rear side of the optical device 10.

If the incident light contains light in the UV region, the light in the UV region is absorbed in the low refractive index layer 23. In other words, light in the UV region is absorbed in the top region 17, the second low refractive index region 16, the second grating region 15, and the intermediate region 14 when it passes therethrough.

Consequently, light in the wavelength range enhanced in the second grating region 15 and light in the wavelength range enhanced in the first grating region 13 emerge from the front side of the optical device 10. Thus, the light that has passed through the regions in the optical device 10 emerges from the rear side of the optical device 10 as transmitted light.

Due the low refractive index layer 23 having absorptivity for light in the UV region, transmitted light from the optical device 10 is prevented from containing light in the UV region even when the incident light on the optical device 10 contains light in the UV region. In other words, light in the visible region dominates the transmitted light from the optical device 10. It should be noted that reflected light from the optical device 10 may contain light in the UV region. For example, the wavelength range enhanced in the first grating region 13 or the second grating region 15 may be a wavelength range in the UV region, or the light reflected at the interfaces between the regions may contain light in the UV region.

The wavelength ranges enhanced in the grating regions 13, 15 can be controlled by controlling the periods of the sub-wavelength gratings of the respective grating regions 13, 15, thicknesses T1, T2 of the respective grating regions 13, 15, and materials of the concavo-convex structure layer 21, the high refractive index layer 22, and the low refractive index layer 23.

As described above, light emerging from the front side of the optical device 10 is not only light in the wavelength range enhanced in the grating regions 13, 15, but also light caused by reflection or interference in the regions of the optical device 10. These types of light contain wavelength ranges different from the wavelength ranges enhanced in the grating regions 13, 15. Therefore, if the intensity of light in the different wavelength ranges emerging from the front side of the optical device 10 is high, wavelength selectivity for reflected light extracted to the front side of the optical device 10 is lowered.

If wavelength selectivity for reflected light is desired to be high, the top region 17 is preferred to have a function of preventing light in the wavelength ranges different from those enhanced in the grating regions 13, 15 from emerging from the front side, according to use of the optical device 10. In other words, the top region 17 is preferred to be configured to cancel light in different wavelength ranges. Specifically, the top region 17 is preferred to weaken the light in different wavelength ranges using interference or to reflect such light to the rear side to reduce the intensity of the light in different wavelength ranges emerging from the front side. The wavelength ranges of light to be cancelled by the top region 17 can be controlled by controlling the thickness of the top region 17 and the average refractive index, or in other words, can be controlled by controlling the thickness and the material of the low refractive index layer 23. In other words, the thickness and the material of the low refractive index layer 23 may be selected so that light other than in the wavelength ranges enhanced in the grating regions 13, 15 is prevented from emerging from the front side via the top region 17.

Furthermore, since the surface of the low refractive index layer 23, which is the outermost surface of the optical device 10, has asperities, surface reflection of the optical device 10 can be reduced or prevented compared to the mode in which the outermost surface of the optical device 10 is flat. This configuration can also prevent light in the wavelength ranges different from those of the light enhanced in the grating regions 13, 15, from emerging from the front side of the optical device 10. This may enhance wavelength selectivity for light extracted to the front side of the optical device 10.

In the case where sub-wavelength gratings are configured by the grating high refractive index portions 13a, 15a extending in strips in one direction, light polarized in a specific direction depending on the array direction of the sub-wavelength gratings undergoes resonance in the grating regions 13, 15 as a result of multiple reflection, and emerges as reflected light. Thus, according to the optical device 10 of the first embodiment, reflected light can be efficiently extracted from incident light with uniform polarization.

If wavelength selectivity for reflected light is not to be emphasized, the top region 17 does not necessarily have to have a light canceling function in wavelength ranges different from those enhanced in the grating regions 13, 15, according to use of the optical device 10.

The optical device 10 may be used so that light enters from the rear side thereof. In this case, the light in the wavelength ranges enhanced in the grating regions 13, 15 can also emerge from the rear side of the optical device 10 as reflected light. Thus, the light that has passed through the regions in the optical device 10 emerges from the front side of the optical device 10 as transmitted light. If light in the UV region is desired to be obtained as reflected light enhanced in the grating regions 13, 15, light may need to be incident on the rear side because the amount of light in the UV region entering the grating regions 13, 15 increases before being absorbed by the low refractive index layer 23 and thus light used for resonance can be increased. It is difficult to have the low refractive index layer 23 absorbed light in the entire UV region contained in the incident light, and also, it is difficult to have the grating regions 13, 15 produced resonance in the entire UV region contained in the incident light for reflection. Therefore, absorption of light in the UV region due to the low refractive index layer 23 coupled with absorption of light in the UV region due to the grating regions 13, 15 can reliably minimize UV light contained in the transmitted light of the optical device 10. In other words, the UV light shielding function can be enhanced in the optical device 10.

[Details of Optical Device]

In the optical device 10 described above, the wavelength range of light undergoing resonance in the first grating region 13 and the wavelength range of light undergoing resonance in the second grating region 15 may be determined according to the wavelength range of light desired to be extracted as reflected light or transmitted light.

For example, if high intensity reflected light in a narrower wavelength range is desired to be obtained, i.e., if wavelength selectivity for reflected light is desired to be enhanced, it is preferred that the wavelength range of light undergoing resonance in the first grating region 13 is nearer the wavelength range of light undergoing resonance in the second grating region 15. When light in a specific wavelength range undergoes resonance in the second grating region 15 and if, in this case, the difference in refractive index is small between the second grating region 15 and the intermediate region 14, for example, part of the light in the specific wavelength range may leak to the intermediate region 14 every time reflection occurs in the second grating region 15. In this case, if the wavelength ranges of light undergoing resonance in the first and second grating regions 13 and 15 match each other, the light in the specific wavelength range leaked to the intermediate region 14 also enters the first grating region 13 and undergoes resonance, thereby emerging as reflected light. Thus, wavelength selectivity for reflected light emerging from the optical device 10 can be enhanced.

If UV light absorptivity in the optical device 10 is to be more emphasized than wavelength selectivity for reflected light, the material or the thickness of the low refractive index layer 23 may be determined considering UV light absorptivity in the low refractive index layer 23, in preference to reducing loss due to multiple reflection in the second grating region 15 or controlling the wavelength range undergoing resonance therein. In this case, the wavelength range of light resonating in the first grating region 13 may be separate from the wavelength range of light resonating in the second grating region 15.

Hereinafter, a preferred configuration for enhancing wavelength selectivity for reflected light will be described. In order to enhance wavelength selectivity for reflected light, i.e., in order to match wavelength ranges of light undergoing resonance, between the first and second grating regions 13 and 15, the optical thicknesses, which are parameters each expressed as a product of an average refractive index and a film thickness, may need to match between the first and second grating regions 13 and 15. Specifically, as the optical thicknesses become closer to each other in the first and second grating regions 13 and 15, wavelength ranges of light undergoing resonance become closer, thereby enhancing wavelength selectivity. The present inventors have simulated a range of optical thickness ratio between the first and second grating regions 13 and 15 offering good wavelength selectivity for reflected light. The details will be described.

The volume ratio of the first grating high refractive index portions 13a to the entire first grating region 13 is equal to the area ratio of the first grating high refractive index portions 13a to the entire first grating region 13 as viewed in the first direction. The area ratio, in other words, is an area ratio of the first grating high refractive index portions 13a in a cross section including the grating first high refractive index portions 13a, which is orthogonal to the thickness direction. If the area of the first grating high refractive index portions 13a varies depending on the cross section, the area ratio of the first grating high refractive index portions 13a in a cross section in which the area of the first grating high refractive index portions 13a is maximized is adopted.

When the area ratio of the first grating high refractive index portions 13a is R1, the area ratio of the first grating low refractive index portions 13b in the cross section can be expressed by 1–R1.

When the refractive index of the material of the high refractive index layer 22 is n1, and the refractive index of the material of the concavo-convex structure layer 21 is n2 (n1>n2), an average refractive index NA1 of the first grating region 13 can be expressed by the following Formula (1).

$$NA1 = n1 \times R1 + n2 \times (1-R1) \tag{1}$$

Furthermore, an optical thickness OT1 of the first grating region 13 can be expressed by the following Formula (2), using the average refractive index NA1 and a thickness T1 of the first grating region 13.

$$OT1 = T1 \times NA1 = T1 \times \{n1 \times R1 + n2 \times (1-R1)\} \tag{2}$$

The second period P2, which is the period of the grating structure, in the second grating region 15, matches the first period P1 in the first grating region 13. However, as viewed in the first direction, the width of each second grating high refractive index portion 15a of the second grating region 15 is larger than the width of each first grating low refractive index portion 13b of the first grating region 13. Furthermore, the width of each second grating low refractive index portion 15b is smaller than the width of each first grating high refractive index portion 13a.

The volume ratio of the second grating high refractive index portions 15a to the entire second grating region 15 is equal to the area ratio of the second grating high refractive index portions 15a to the entire second grating region 15 as viewed in the first direction. The area ratio, in other words, is an area ratio of the second grating high refractive index portions 15a in a cross section including the second grating high refractive index portions 15a, which is orthogonal to the thickness direction. If the area of the second grating high refractive index portions 15a varies depending on the cross section, the area ratio of the second grating high refractive index portions 15a in a cross section in which the area of the second grating high refractive index portions 15a is maximized is adopted.

When the area ratio of the second grating high refractive index portions 15a is R2, the area ratio of the second grating low refractive index portions 15b in the cross section can be expressed by 1–R2.

When the refractive index of the material of the high refractive index layer 22 is n1, and the refractive index of the material of the low refractive index layer 23 is n3 (n1>n3), an average refractive index NA2 of the second grating region 15 can be expressed by the following Formula (3).

$$NA2 = n1 \times R2 + n3 \times (1-R2) \tag{3}$$

Furthermore, an optical thickness OT2 of the second grating region 15 can be expressed by the following Formula (4), using the average refractive index NA2 and a thickness T2 of the second grating region 15.

$$OT2 = T2 \times NA2 = T2 \times \{n1 \times R2 + n3 \times (1-R2)\} \tag{4}$$

As the ratio of the optical thickness OT2 of the second grating region 15 to the optical thickness OT1 of the first grating region 13 (OT2/OT1) becomes closer to 1, the wavelength ranges of light undergoing resonance in the first and second grating regions 13, 15 become closer to each other. As the above ratio deviates from 1, the wavelength ranges of light undergoing resonance in the first and second grating regions 13, 15 become different from each other. The present inventors have confirmed that, in order to obtain high wavelength selectivity, the value of OT2/OT1 is preferred to be 0.5 or more and 2.0 or less, and in order to obtain higher wavelength selectivity, the value of OT2/OT1 is more preferred to be 0.625 or more and 1.6 or less.

If the value of OT2/OT1 is 1.0, i.e., if the optical thickness OT1 matches the optical thickness OT2, the wavelength range of light undergoing resonance in the first grating region 13 matches the wavelength range of light undergoing resonance in the second grating region 15, and thus wavelength selectivity is particularly enhanced. Accordingly, it is preferred that the material of the layers are selected, and the thicknesses T1, T2 and the width of the convexity 21a of the concavo-convex structure layer 21 are set, so that the optical thickness OT1 matches the optical thickness OT2. The smaller is the difference in refractive index between the material of the concavo-convex structure layer 21 and the material of the low refractive index layer 23, the easier it is to bring the ratio of the optical thickness OT2 to the optical thickness OT1 closer to 1.0.

For example, in order to approximate the area ratio R1 of the first grating high refractive index portions 13a to the area ratio R2 of the second grating high refractive index portions 15a, the width of the convexity 21a may be determined so that the area ratio of the first grating low refractive index portions 13b becomes smaller than the area ratio of the first grating high refractive index portions 13a in the first grating region 13, and the area ratio of the second grating high refractive index portions 15a becomes larger than the area ratio of the second grating low refractive index portions 15b in the second grating region 15. In this case, the area ratio R1 of the first grating high refractive index portions 13a and the area ratio R2 of the second grating high refractive index portions 15a each become larger than 0.5, and accordingly, R1+R2 becomes larger than 1.

With the area ratios R1, R2 each being larger than 0.5, the average refractive indices of the grating regions 13, 15 become higher compared to the mode in which the area ratios R1, R2 are each 0.5 or less, and therefore, the difference in average refractive index increases accordingly between the grating regions 13, 15 and the adjacent regions 12, 14, 16. Consequently, loss due to multiple reflection occurring in the grating regions 13, 15 decreases, and thus, the intensity of reflected light outputted from the grating regions 13, 15 increases.

The array period, as a third period P3, of the first intermediate low refractive index portions 14b in the intermediate region 14, matches the first period P1 in the first grating region 13. As viewed in the first direction, the width of each first intermediate low refractive index portion 14b matches the width of each first grating low refractive index portion 13b.

As viewed in the first direction, the area ratio of the intermediate low refractive index portions 14a to the entire intermediate region 14 is preferred to be equal to or smaller than the difference between the above area ratio of the second grating high refractive index portions 15a and the above area ratio of the first grating low refractive index portions 13b. In other words, when the area ratio of the intermediate high refractive index portions 14a is R3, R3 is preferred to satisfy the following Formula (5). It should be noted that this area ratio, in other words, is an area ratio of the intermediate high refractive index portions 14a in a cross section including the intermediate high refractive index portions 14a, which is orthogonal to the thickness direction. If the area of the intermediate high refractive index portions 14a varies depending on the cross section, the area ratio of the intermediate high refractive index portions 14a in a cross section in which the area of the intermediate high refractive index portions 14a is maximized is adopted.

As viewed in the first direction, if the region where each second grating high refractive index portion 15a is located matches in size with the region where the corresponding first intermediate low refractive index portion 14b and the adjacent intermediate high refractive index portions 14a are located, the area ratio R3 of the intermediate high refractive index portions 14a matches the right-hand side expressed as R1+R2−1. Furthermore, as viewed in the first direction, if the region where each second grating high refractive index portion 15a is located is larger than the region where the corresponding first intermediate low refractive index portion 14b and the adjacent intermediate high refractive index portions 14a are located, or in other words, if each intermediate high refractive index portion 14a is located inside the outer edges of the corresponding second grating high refractive index portion 15a, the area ratio R3 becomes smaller than R1+R2−1.

As described above, in order to enhance the intensity of reflected light outputted from the grating regions 13, 15 using a guided mode resonance phenomenon, the difference in average refractive index is preferred to be large between the grating regions 13, 15 and the regions 12, 14, 16 sandwiching the grating regions 13, 15. Accordingly, the average refractive index of the intermediate region 14 is preferred to be smaller, i.e., the area ratio of the intermediate high refractive index portions 14a is preferred to be smaller. With the configuration satisfying Formula (5), the width of the intermediate high refractive index portion 14a can be reduced so as not to extend outside the corresponding second grating high refractive index portion 15a. Therefore, the area ratio of the intermediate high refractive index portions 14a is prevented from becoming excessively high. Accordingly, the intensity of the reflected light from the grating regions 13, 15 becomes preferable.

In order to enhance the intensity of the reflected light, it is preferred that the difference in average refractive index between the first grating region 13 and each of the first low refractive index region 12 and the intermediate region 14 is preferred to be larger than 0.1. Similarly, it is preferred that the difference in average refractive index between the second grating region 15 and each of the intermediate region 14 and the second low refractive index region 16 is preferred to be larger than 0.1.

It should be noted that the array period of the first top low refractive index portions 17a in the top region 17 also matches the first period P1 in the first grating region 13.

[Method of producing optical device]

Figure 2:
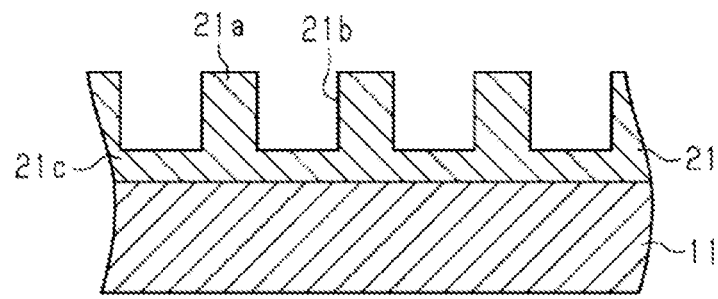
FIG. 2 is a diagram illustrating a step of forming a concavo-convex structure layer in a method of producing an optical device according to the first embodiment.
Figure 3:
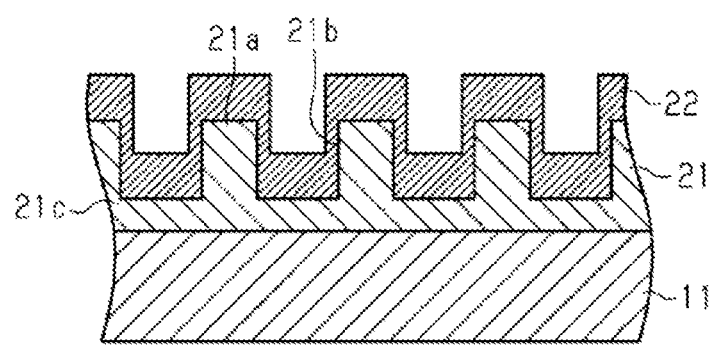
FIG. 3 is a diagram illustrating a step of forming a high refractive index layer in the method of producing an optical device according to the first embodiment.
Figure 4:
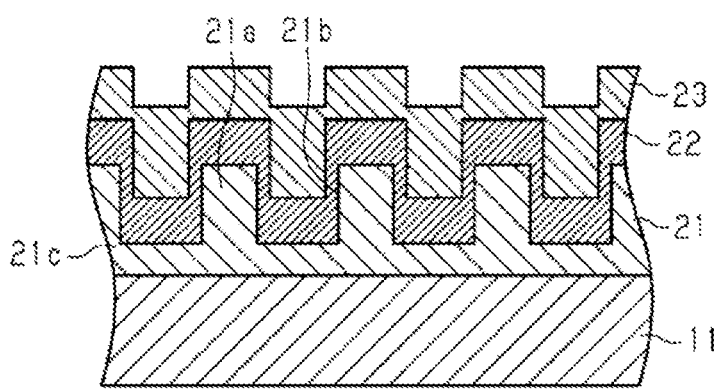
FIG. 4 is a diagram illustrating a step of forming a low refractive index layer in the method of producing an optical device according to the first embodiment.

Referring to FIGS. 2 to 4, a method of producing the optical device 10 will be described.

As shown in FIG. 2, a layer of a low refractive index material is formed first on a surface of the substrate 11, followed by forming a concavo-convex structure on the surface of this layer to form a concavo-convex structure layer 21. The concavo-convex structure layer 21 includes a flat portion 21c extending over the substrate 11, a plurality of convexities 21a protruding from the flat portion 21c, and a plurality of concavities 21b each located between adjacent convexities 21a. The convexities 21a and the concavities 21b extend in strips in the second direction.

The concavo-convex structure is formed using a known microfabrication technique, such as a nanoimprinting method or dry etching method. Of these methods, the nanoimprinting method is preferred because it can easily form fine convexities 21a and concavities 21b.

For example, when forming a concavo-convex structure layer 21 using a UV curable resin as a low refractive index material and using an optical nanoimprinting method, the $$R3 \leq R2-(1-R1)=R1+R2-1 \qquad (5)$$

UV curable resin is applied first on a surface of the substrate 11. Next, a synthetic quartz mold that is an intaglio plate having asperities, which are the inverse of the asperities for the convexities 21a and concavities 21b to be formed, is pressed against the surface of the coating layer of the UV curable resin, followed by irradiating the coating layer and the intaglio plate with UV rays. Subsequently, the intaglio plate is released from the cured UV curable resin. Thus, the asperities of the intaglio plate are transferred to the UV curable resin to form convexities 21a and concavities 21b, while forming a flat portion 21c as a film of the UV curable resin remaining between the concavities 21b and the substrate 11.

Next, as shown in FIG. 3, a high refractive index layer 22 of a high refractive index material is formed on the surface of the concavo-convex structure layer 21. As a method of forming the high refractive index layer 22, a known film forming technique such as a vacuum vapor deposition method or a sputtering method is used. The thickness of the high refractive index layer 22 is set, according to desired thicknesses T1 and T2, so as to be smaller than the height of the convexities 21a. For example, the thickness of the high refractive index layer 22 may be 10 nm or more and 500 nm or less.

When forming a high refractive index layer 22 using a physical vapor deposition method, including a vacuum vapor deposition method and a sputtering method, a film is formed on the convexities 21a of the concavo-convex structure layer 21 and extends, enclosing each of the convexities 21a. Specifically, the width of each second grating high refractive index portion 15a is formed so as to be larger than the width of the corresponding first grating low refractive index portion 13b and first intermediate low refractive index portion 14b forming the corresponding convexity 21a. Accordingly, when a physical vapor deposition method is adopted and even if the area ratio between the convexities 21a and the concavities 21b on the surface of the concavo-convex structure layer 21 is set to 1 to 1, this area ratio may be unavoidably deviated from the area ratio between the first grating high refractive index portions 13a and the second grating high refractive index portions 15a.

Furthermore, as the width of each second grating high refractive index portion 15a increases during film formation, it will become difficult for particles of the deposition materials to adhere onto the concavities 21b. Therefore, the thickness T1 of the first grating high refractive index portions 13a may be deviated from the thickness T2 of the second grating high refractive index portions 15a.

If the wavelength selectivity for reflected light of the optical device 10 is desired to be enhanced, it is preferred that the width of each convexity 21a, i.e., the area ratio between the convexities 21a and the concavities 21b, is set so that the ratio of the optical thickness OT2 to the optical thickness OT1 will be 0.5 or more and 2.0 or less, and more preferably 0.625 or more and 1.6 or less, while compensating for such a deviation in area ratio or thickness due to increase of the width of each second grating high refractive index portion 15a.

Furthermore, when forming a high refractive index layer 22 using a physical vapor deposition method, the high refractive index material may also adhere to the side faces of the convexities 21a of the concavo-concave structure layer 21 in many cases, and therefore, the intermediate high refractive index portions 14a may be unavoidably formed. In this regard, if the width of each intermediate high refractive index portion 14a is controlled to satisfy Formula (5), the intensity of the reflected light from the grating regions 13, 15 can be preferably obtained, although the production method adopted may form the intermediate high refractive index portions 14a.

The width of each intermediate high refractive index portion 14a can be controlled depending on the film formation method or the film formation conditions. For example, the vapor deposition method and the sputtering method are different from each other in the angular dependence of the direction in which the particles move. Therefore, the width of each intermediate high refractive index portion 14a can be changed depending on which of the methods is used. Furthermore, the width of each intermediate high refractive index portion 14a may be reduced by etching the high refractive index layer 22 after being formed.

Next, as shown in FIG. 4, a low refractive index layer 23 of a low refractive index material is formed on the surface of the high refractive index layer 22. As a method of forming the low refractive index layer 23, a known film forming technique such as a vacuum vapor deposition method or a sputtering method may be used. For example, the thickness of the low refractive index layer 23 may be 10 nm or more and 500 nm or less.

In the present embodiment, the optical device 10 can be produced without the need of precise thickness control of the layers contacting the grating regions, or specifically, if the optical device 10 is formed using a nanoimprinting method, the optical device 10 can be produced without the need of precise thickness control of the remaining film, compared to the mode in which the layers contacting the grating regions are used as waveguide layers in guided mode resonance. Accordingly, the optical device 10 can be easily produced.

Furthermore, the optical device 10 can be formed using a production method in which an optical nanoimprinting method is combined with a vacuum vapor deposition method or the like. Therefore, the optical device 10 is suitable for production using a roll-to-roll method. Accordingly, the optical device 10 is also suitable for mass production.

It should be noted that, in the production method described above, the concavo-convex structure layer 21 may be formed using a thermosetting resin or a thermoplastic resin in place of a UV curable resin, through a nanoimprinting method. If a thermosetting resin is used, irradiation of UV rays may need to be changed to heating, and if a thermoplastic resin is used, irradiation of UV rays may need to be changed to heating and cooling.

[Modifications]

The optical device 10 of the embodiment described above may be modified as follows.

Figure 5:
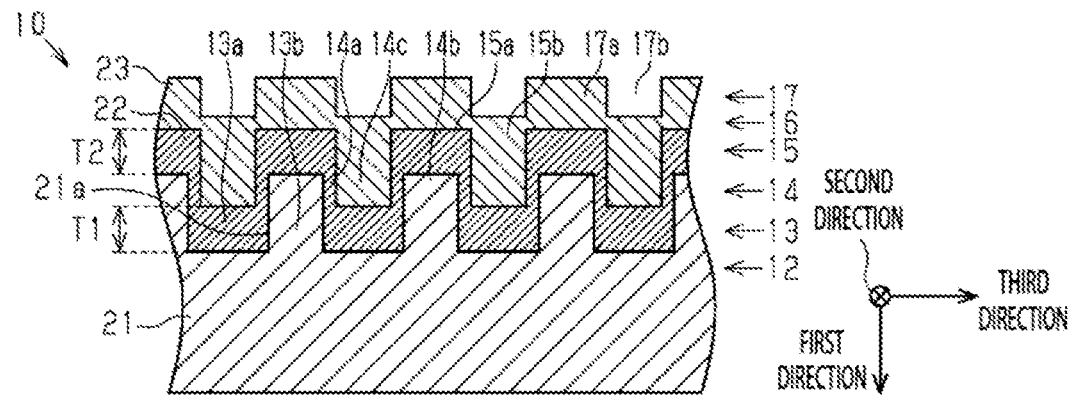
FIG. 5 is a diagram illustrating a cross-sectional structure of a modification of the optical device according to the first embodiment.

As shown in FIG. 5, the optical device 10 does not necessarily have to include a substrate 11. In this case, a concavo-convex structure layer 21 is formed by forming a concavo-convex structure on a surface of a plate-shaped member made of a low refractive index material. For example, a concavo-convex structure may be formed on a surface of a sheet made of a thermoplastic resin, or may be formed on a surface of a substrate made of synthetic quartz. When forming a concavo-convex structure on a synthetic quartz substrate, a known technique, such as a dry etching method, may be used.

Figure 6:
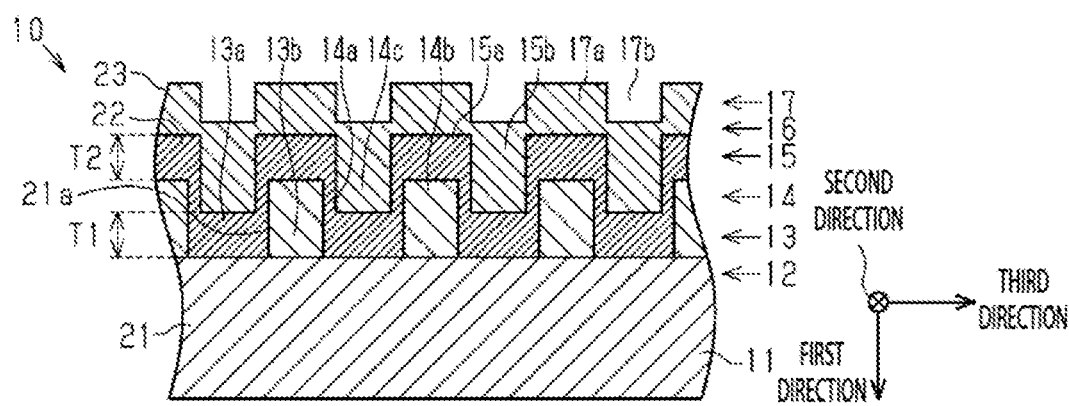
FIG. 6 is a diagram illustrating a cross-sectional structure of a modification of the optical device according to the first embodiment.

Furthermore, as shown in FIG. 6, convexities 21a may be directly formed on a surface of a substrate 11. In other words, the concavo-convex structure layer 21 does not necessarily have to include the flat portion 21c continuous to the convexities 21a. In this case, the convexities 21a and the substrate 11 form a concavo-convex structure layer 21, and the regions in the substrate 11 contacting the convexities 21a serve as the first low refractive index region 12. Such a concavo-convex structure layer 21 can be formed, for example, using photolithography.

Also, the low refractive index layer 23 may be formed using various coating methods. If a low refractive index layer 23 is formed using a coating method, the material used for the low refractive index layer 23 may be soda glass. However, in order to form a low refractive index layer 23 into a shape conforming to the high refractive index layer 22, or in other words, in order to preferably form asperities on the surface of the low refractive index layer 23, the low refractive index layer 23 is preferred to be formed using a physical vapor deposition method. The low refractive index layer 23 having asperities can control the wavelength which is to be cancelled by the top region 17 through control of the average refractive index in the top region 17, or can minimize surface reflection of the optical device 10.

It should be noted that, if the function of the top region 17 is not to be emphasized, the surface of the low refractive index layer 23 may be flat. In this case, the optical device 10 does not include the top region 17, i.e., the region corresponding to the asperities on the surface of the low refractive index layer 23, and the surface of the second low refractive index region 16 serves as the outermost surface of the optical device 10.

[Application Examples of Optical Device]

As a specific application example of the optical device 10 described above, a description will be given of a mode in which the optical device 10 is used as a filter provided to a display device.

Figure 7:
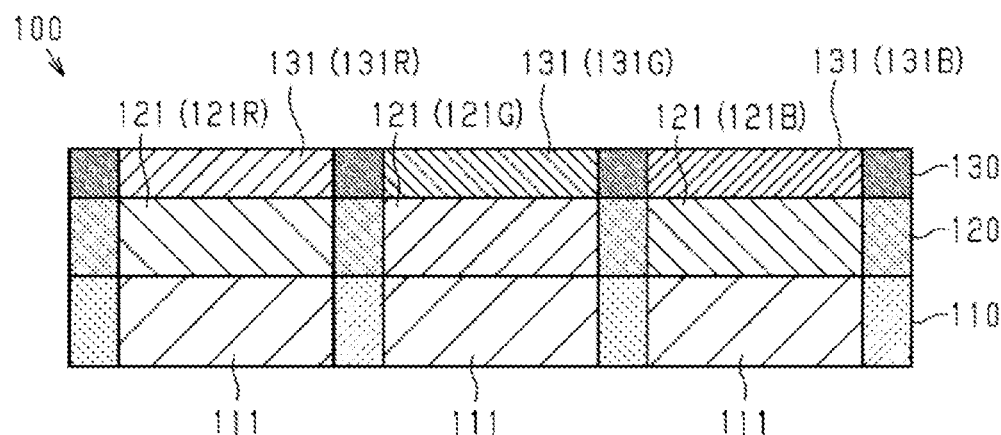
FIG. 7 is a diagram illustrating a display device, in plain view, provided with a filter to which the optical device according to the first embodiment is applied.

As shown in FIG. 7, a display device 100 includes a light source layer 110, a conversion layer 120, and a filter layer 130. The light source layer 110 includes a plurality of luminescent elements 111. The luminescent elements 111 includes respective ultraviolet LEDs (UV-LEDs) and output UV light. For example, the UV-LEDs are each formed into a size having a length and a width of several tens of The conversion layer 120 includes a plurality of sub-pixel regions 121. The plurality of sub-pixel regions 121 include three types of sub-pixel regions 121 which are red sub-pixel regions 121R, green sub-pixel regions 121G, and blue sub-pixel regions 121B. The red sub-pixel regions 121R include an inorganic phosphor with red light emerging after being excited with UV light, the green sub-pixel regions 121G include an inorganic phosphor with green light emerging after being excited with UV light, and the blue sub-pixel regions 121B include an inorganic phosphor with blue light emerging after being excited with UV light. In the present embodiment, red light has an intensity peak in a wavelength range of 600 nm or more and 700 nm or less, green light has an intensity peak in a wavelength range of 520 nm or more and 580 nm or less, and blue light has an intensity peak in a wavelength range of 400 nm or more and 500 nm or less.

Although the sub-pixel regions 121R, 121G and 121B are each shown as one region in FIG. 7, in practice, a red sub-pixel region 121R, a green sub-pixel region 121G, and a blue sub-pixel region 121B are repeatedly arranged in a predetermined order. A unit region including a red sub-pixel region 121R, a green sub-pixel region 121G, a blue sub-pixel region 121B is a pixel region. It should be noted that adjacent sub-pixel regions 121 may be in contact with each other, or a region defining adjacent sub-pixel regions 121 may be provided therebetween.

The plurality of luminescent elements 111 are arranged so that each of them face the corresponding one of the sub-pixel regions 121R, 121G and 121B, i.e., one luminescent element 111 is arranged under one sub-pixel region 121.

The filter layer 130 includes a plurality of filter regions 131. The optical device 10 is applied to each filter region 131. The plurality of filter regions 131 include three types of filter regions 131 which are red filter regions 131R, green filter regions 131G, and blue filter regions 131B. The red filter regions 131R pass red light therethrough, the green filter regions 131G pass green light therethrough, and the blue filter regions 131B pass blue light therethrough. Each red filter region 131R is located above the corresponding one of the red sub-pixel regions 121R, each green filter region 131G is located above the corresponding one of the green sub-pixel regions 121G, and each blue filter region 131B is located above the corresponding one of the blue sub-pixel regions 121B. The side where the filter layer 130 is located with respect to the conversion layer 120 is the front side of the display device 100.

The red filter regions 131R may need to pass at least red light in the visible region. For example, the red filter regions 131R may pass light in the entire visible region and reflect light in the UV region, or may pass red light and reflect green light and blue light. Similarly, the green filter regions 131G may need to pass at least green light in the visible region, and the blue filter regions 131B may need to pass at least blue light in the visible region.

Accordingly, the structure of the red filter regions 13 R, the structure of the green filter regions 131G, and the structure of the blue filter regions 131B do not necessarily have to be different from each other. For example, the filter regions 131R, 131G and 131B may have the same structure, and may each pass light in the entire visible region therethrough and reflect light in the UV region. With this configuration, the filter layer 130 can be easily formed compared to the case where the structure of the red filter regions 131R, the structure of the green filter regions 131G, and the structure of the blue filter regions 131B are different from each other.

The optical device 10 is applied to each of the filter regions 131 so that, for example, the substrate 11 faces a corresponding one of the sub-pixel region 121. If the filter regions 131R, 131G and 131B have the same structure, a plurality of filter regions 131 can be formed simultaneously in the same production process. Furthermore, even if the filter regions 131R, 131G and 131B have structures different from each other, a plurality of filter regions 131 can be formed simultaneously in the same production process by changing the period of the convexities 21a depending on the filter regions when forming the convexities 21a, as long as the filter layer is of a mode in which reflected light and transmitted light can have different wavelength ranges by only changing the period of the sub-wavelength gratings.

In these cases, the substrate 11, the first low refractive index region 12, the first grating region 13, the intermediate region 14, the second grating region 15, the second low refractive index region 16, and the top region 17 are continuous between the plurality of filter regions 131. In other words, the plurality of filter regions 131 include one common substrate 11, concavo-convex structure layers 21 which are continuous between the filter regions 131, high refractive index layers 22 which are continuous between the filter regions 131, and low refractive index layers 23 which are continuous between the filter regions 131. In the case of changing the period of the sub-wavelength gratings depending on the filter regions, the concavo-convex structure layers 21 in the plurality of filter regions 131 can be formed simultaneously through a nanoimprinting method, for example, using a synthetic quartz mold in which the period of asperities is changed depending on portions of the filter regions 131 of the respective colors. The high refractive index layers 22 and the low refractive index layers 23 corresponding to the filter regions 131 of the respective colors can also be formed simultaneously. Accordingly, the plurality of filter regions 131 can be easily formed.

Figure 8:
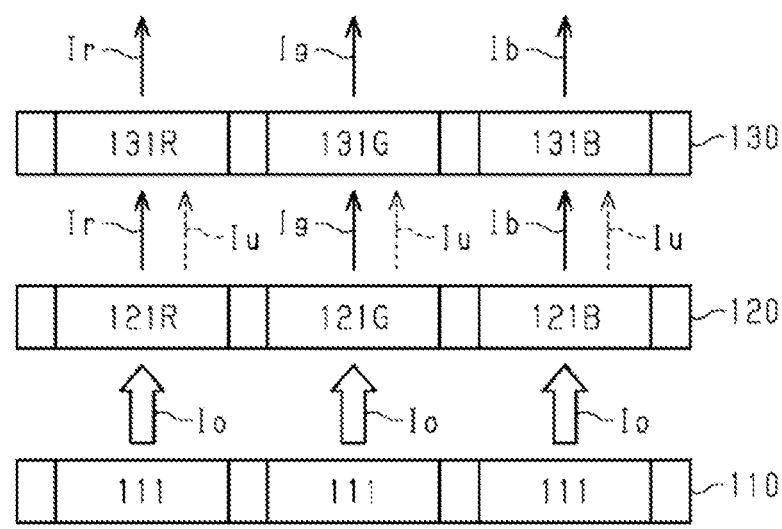
FIG. 8 is a diagram illustrating operation of a display device provided with a filter to which the optical device according to the first embodiment is applied.

As shown in FIG. 8, the luminescent elements 111 output UV light Io. The UV light Io outputted from the luminescent elements 111 is incident on the sub-pixel regions 121 located above the respective luminescent elements 111. Thus, red light Ir emerges from the red sub-pixel regions 121R, green light Ig emerges from the green sub-pixel regions 121G, and blue light Ib emerges from the blue sub-pixel regions 121B.

The red light Ir emerging from each of the red sub-pixel regions 121R enters the corresponding one of the red filter regions 131R located above. The red filter regions 131R reflect light in parts of the wavelength range, while transmitting red light, and therefore, the red light Ir that has entered the respective red filter regions 131R passes therethrough and emerges from the front side of the display device 100.

The green light Ig emerging from each of the green sub-pixel regions 121G enters the corresponding one of the green filter regions 131G located above. The green filter regions 131G reflect light in parts of the wavelength range, while transmitting green light, and therefore, the green light Ig that has entered the green filter regions 131G passes therethrough and emerges from the front side of the display device 100.

The blue light Ib emerging from each of the blue sub-pixel regions 121B enters the corresponding one of the blue filter regions 131B located above. The blue filter regions 131B reflect light in parts of the wavelength range, while transmitting blue light, and therefore, the blue light Ib that has entered the blue filter regions 131B passes therethrough and emerges from the front side of the display device 100.

The intensity of the UV light Io applied to the sub-pixel regions 121 is controlled according to the image data inputted to the display device 100 to control the intensity of the red light, green light, and blue light emerging from the sub-pixel regions 121. Thus, the colors visually observed in the pixel regions are controlled. Consequently, an image corresponding to the image data is displayed on the display device 100. Using the micro-UV-LEDs, the display device 100 can achieve a high-definition image with high brightness and a wide viewing range.

Part of the UV light Io emerging from the luminescent elements 111 passes through the sub-pixel regions 121. Thus, UV light Iu that has passed through the sub-pixel regions 121 enters the filter regions 131. Since the filter regions 131 have absorptivity to UV light due to the presence of the low refractive index layers 23, the UV light Iu is absorbed by the filter regions 131. Consequently, UV light is prevented from leaking from the front side of the display device 100. Accordingly, UV light is prevented from affecting the outside, such as the viewer.

If the filter regions 131 have structures in which the light in the UV region is reflected due to a guided mode resonance phenomenon, UV light is more reliably prevented from leaking from the front side of the display device 100. Furthermore, in such structures, part of the UV light that has passed through the sub-pixel regions 121 is reflected by the filter regions 131 and enters the sub-pixel regions 121 located below the filter regions 131 to contribute to exciting the inorganic phosphor. Thus, production efficiency of colored light in the sub-pixel regions 121 is enhanced with respect to the luminescence in the luminescent elements 111.

Furthermore, sharpness of the colors emerging from the display device 100 can be enhanced with the structures in which the red filter regions 131R transmit only red light in the visible region, the green filter regions 131G transmit only green light in the visible region, and the blue filter regions 131B transmit only blue light in the visible region.

It should be noted that application of the optical device 10 is not limited to the filter for shielding against UV light provided to the display device 100. As long as shielding against UV light is desired, the optical device 10 may be applied to wavelength selective filters used for those devices which convert or separate colors of light, or those displays which are attached to articles for the purposes of anti-counterfeiting or decoration.

According to the first embodiment, the advantageous effects enumerated below can be obtained.

(1) The optical device 10 can selectively reflect or transmit light due to the occurrence of a guided mode resonance phenomenon in the first grating region 13 and the second grating region 15. Furthermore, since the low refractive index layer 23 absorbs light in the UV region, the optical device 10 has a light shielding function in the UV region. Accordingly, the optical device 10 can be used as a filter provided to those devices in which leakage of UV light is required to be minimized, such as the display device 100 using excitation of a phosphor due to UV light, expanding application of the optical device 10.

(2) If the mode is one in which the wavelength range of the UV region is included at least in either of the wavelength range enhanced in the first grating region 13 and the wavelength range enhanced in the second grating region 15, light in the UV region is further prevented from being included in the transmitted light of the optical device 10. In other words, the UV light shielding function of the optical device 10 can be further enhanced.

(3) The top region 17 has a light cancelling function in wavelength ranges different from the wavelength ranges of reflected light enhanced by the grating regions 13, 15 to prevent such light in different wavelength ranges from emerging together with the reflected light. Thus, the optical device 10 will have high wavelength selectivity for reflected light.

(4) If the ratio of the optical thickness OT2 of the second grating region 15 to the optical thickness OT1 of the first grating region 13 is 0.5 or more and 2.0 or less, and more preferably 0.625 or more and 1.6 or less, light in the close wavelength ranges enhanced in the two grating regions 13, 15 can be obtained as reflected light. Therefore, the optical device 10 will have high wavelength selectivity for reflected light.

(5) If a relation $R3<R1+R2-1$ is satisfied for the area ratio R3 of the intermediate high refractive index portions 14a in the intermediate region 14, the width of each intermediate high refractive index portion 14a can be minimized, and therefore, the average refractive index of the intermediate region 14 is prevented from becoming excessively high. Accordingly, the difference in average refractive index is preferably secured between the grating regions 13, 15 and the adjacent regions, and therefore, the intensity of the reflected light from the grating regions 13, 15 obtained due to a guided mode resonance phenomenon can be improved.

Furthermore, if each second grating high refractive index portion 15a is configured to extend outside the corresponding intermediate high refractive index portions 14a as viewed in the first direction, the width of each intermediate high refractive index portion 14a can be minimized, and thus, similarly to the above, the intensity of the reflected light from the grating regions 13, 15 can be improved.

(6) The optical device 10 is formed through a step of forming a concavo-convex structure layer 21 of a low refractive index material, a step of forming a high refractive index layer 22 on the surface of the concavo-convex structure layer 21, and a step of forming a low refractive index layer 23 on the surface of the high refractive index layer 22. According to such a production method, wavelength selectivity of the optical device 10 can be enhanced without the need of precise thickness control of the layers contacting the sub-wavelength gratings, and therefore, the optical device 10 can be easily produced.

Furthermore, in the production method of using a resin as a low refractive index material and forming a concavo-convex structure layer 21 by pressing an intaglio plate against a coated layer of the resin and curing the resin, the concavo-convex structure layer 21 is formed using a nano-imprinting method, and therefore, a concavo-convex structure layer 21 having micro-asperities can be preferably and easily formed. Also, if a production method of forming a low refractive index layer 23 using a physical vapor deposition method is used, a low refractive index layer 23 with a surface conforming to the asperities on the surface of the high refractive index layer 22 can be preferably formed. In addition, if a physical vapor deposition method is used for forming a high refractive index layer 22, the high refractive index layer 22 is formed so that each second grating high refractive index portion 15a extends outside the corresponding intermediate high refractive index portions 14a as viewed in the first direction. According to such a production method, the width of each intermediate refractive index portion 14a can be minimized, while adopting a method in which such intermediate high refractive index portions 14a are formed on both side faces of each convexity 21a. Therefore, the intensity of the reflected light from the grating regions 13, 15 becomes preferable.

Second Embodiment

Referring to FIGS. 9-12, a second embodiment of the optical device and the method of producing an optical device will be described. The following description is focused on differences between the second and first embodiments, and therefore components similar to the first embodiment are designated with like reference signs to omit repeated explanation.

[Optical Device]

Figure 9:
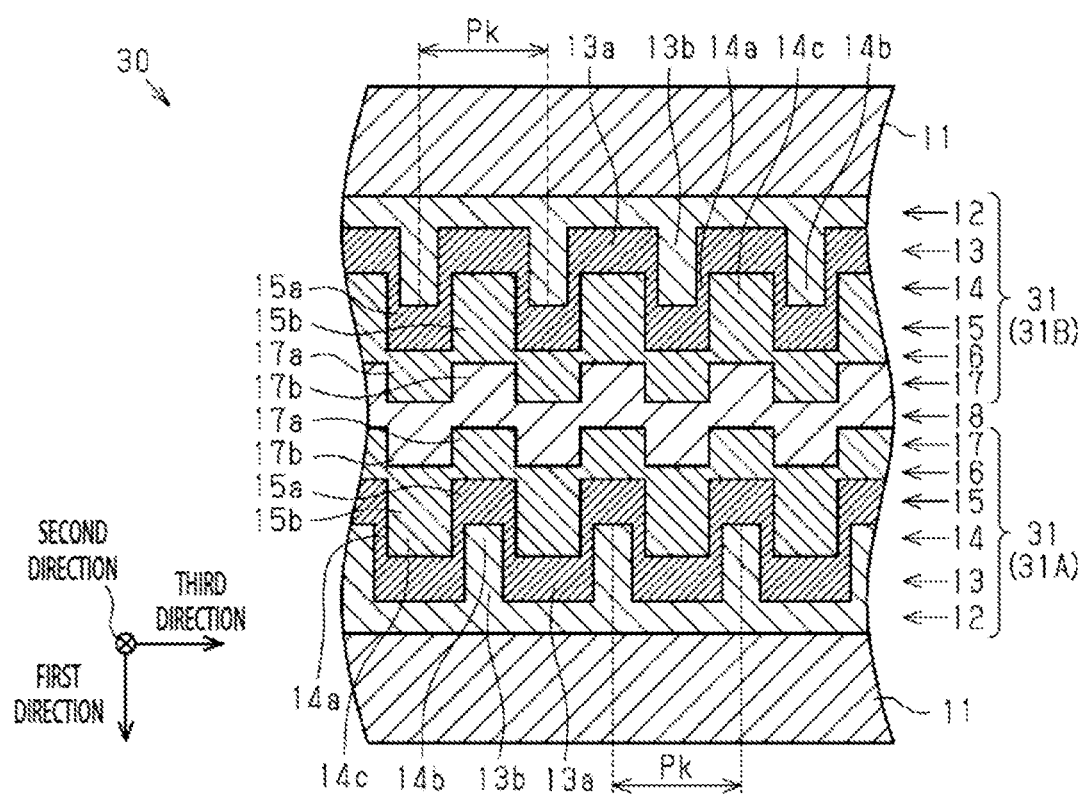
FIG. 9 is a diagram illustrating an example of a cross-sectional structure of an optical device according to a second embodiment.
Figure 10:
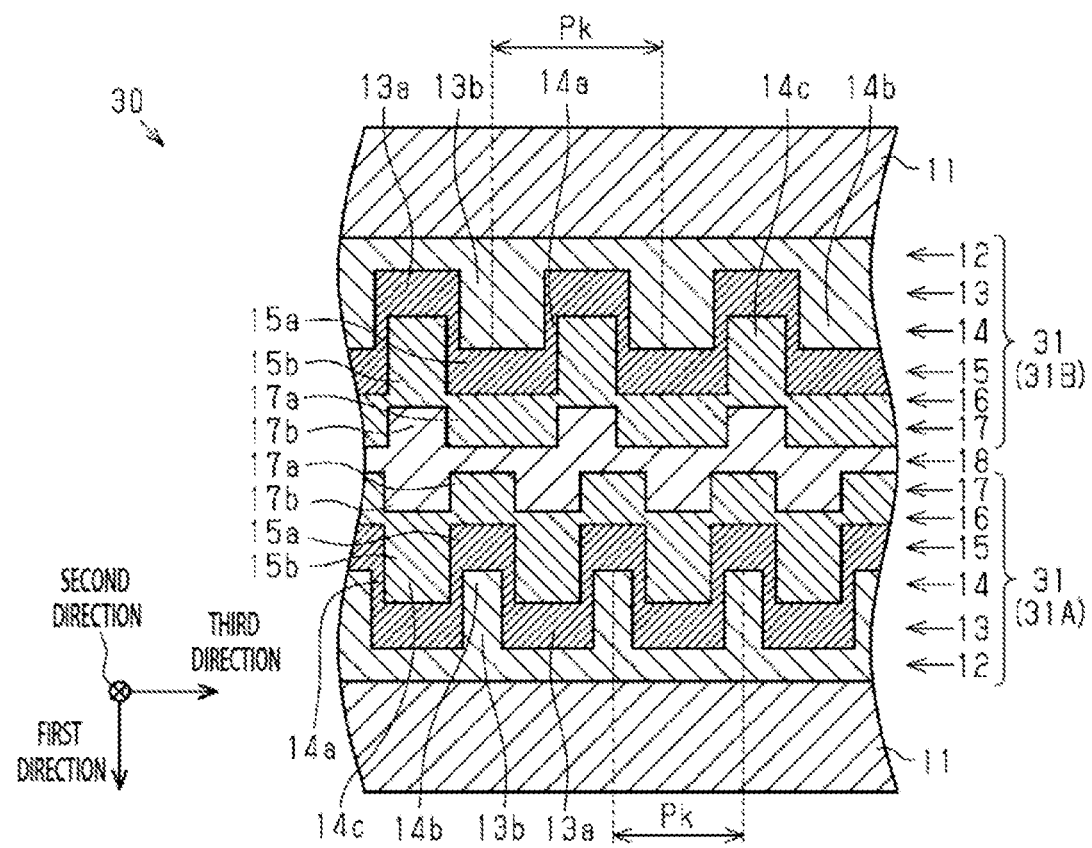
FIG. 10 is a diagram illustrating an example of a cross-sectional structure of an optical device according to the second embodiment.

Referring to FIGS. 9 and 10, an optical device of the second embodiment will be described. As shown in FIG. 9, an optical device 30 of the second embodiment includes two resonant structures 31 each of which is a structure including a first low refractive index region 12, a first grating region 13, an intermediate region 14, a second grating region 15, a second low refractive index region 16, and a top region 17, which have been described in the first embodiment. However, the second top low refractive index portions 17b in each top region 17 are filled with a low refractive index material.

The two resonant structures 31, which are a first resonant structure 31A and a second resonant structure 31B, are adjacent to each other in the first direction and sandwiched between two substrates 11. In other words, the optical device 30 of the second embodiment has a structure in which two optical devices 10 of the first embodiment are bonded together so that the top regions 17 face each other on the inside. Specifically, the optical device 30 of the second embodiment has a structure in which four sub-wavelength gratings are arranged in the first direction with a distance therebetween and embedded in a low refractive index material. It should be noted that a first substrate 11 side with respect to a second substrate 11 is the front side of the optical device 30, and the second substrate 11 side with respect to the first substrate 11 is the rear side of the optical device 30.

In the optical device 30, the extension direction of the grating high refractive index portions 13a, 15a and the grating low refractive index portions 13b, 15b as grating elements of the first resonant structure 31A, matches the extension direction of the grating high refractive index portions 13a, 15a and the grating low refractive index portions 13b, 15b as grating elements of the second resonant structure 31B. In other words, the array direction of the sub-wavelength gratings of the first resonant structure 31A matches the array direction of the sub-wavelength gratings of the second resonant structure 31B. Furthermore, the low refractive index portions and the high refractive index portions in the intermediate regions 14 and the top regions 17 of both resonant structures 31 also extend in the same direction as the direction in which the grating elements extend.

Between the first and second resonant structures 31A, 31B, a boundary low refractive index region 18 is located, extending uniformly over the top regions 17 of the first and second resonant structures 31A, 31B. The boundary low refractive index region 18 is continuous to the second top low refractive index portions 17b in the top region 17 of the first resonant structure 31A and to the second top low refractive index portions 17b in the top region 17 of the second resonant structure 31B, and is made of the same material as the material of the second top low refractive portions 17b of these resonant structures 31.

The period, as a structural period Pk, in the array of the convexities 21a of the first resonant structure 31A may be the same as the period, as a structural period Pk, in the array of the convexities 21a of the second resonant structure 31B as shown in FIG. 9, or these periods may be different from each other as shown in FIG. 10. The structural period Pk matches the first period P1 in the corresponding first grating region 13.

If high wavelength selectivity for reflected light is to be emphasized, the ratio of the optical thickness OT2 of the second grating region 15 to the optical thickness OT1 of the first grating region 13 is preferred to be 0.5 or more and 2.0 or less, and more preferred to be 0.625 or more and 1.6 or less, as in the first embodiment, in each of the first and second resonant structures 31A and 31B.

[Operation of Optical Device]

In the structure in which the two resonant structures 31A, 31B have the same structural period Pk, variation in wavelength range of light undergoing resonance is reduced in the four grating regions 13, 15 of the optical device 30. Since reflected light in the wavelength ranges enhanced by the four grating regions 13, 15 emerges from the optical device 30, the intensity of light in a specific wavelength range of the reflected light further increases, compared to the optical device 10 of the first embodiment. In this case, if the ratio of the optical thickness OT2 to the optical thickness OT1 is the same between the first and second resonant structures 31A, 31B, variation in optical thickness is reduced in the four grating regions 13, 15 and the wavelength ranges of light undergoing resonance in the grating regions 13, 15 become closer, thereby further enhancing wavelength selectivity for reflected light.

On the other hand, in the structure in which the two resonant structures 31A, 31B have different structural periods Pk, the wavelength range of light undergoing resonance in the grating regions 13, 15 of the first resonant structure 31A is different from the wavelength range of light undergoing resonance in the grating regions 13, 15 of the second resonant structure 3 B. Consequently, the optical device 30 outputs reflected light which contains light in the wavelength ranges enhanced by the grating regions 13, 15 of the first resonant structure 31A and light in the wavelength ranges enhanced by the grating regions 13, 15 of the second resonant structure 31B. Thus, of the light incident on the optical device 30, the light that has passed through the resonant structures 31A, 31B and the boundary low refractive index region 18 emerges from the optical device 30 as transmitted light. Depending on the setting of the structural periods Pk in the resonant structures 31A, 31B, the wavelength ranges of light enhanced and reflected in the resonant structures 31A, 31B can be determined to thereby also control the wavelength range of transmitted light.

In this way, the optical device 30 of the second embodiment, which includes a plurality of resonant structures 31 each including two grating regions 13, 15, can enhance flexibility when controlling the wavelength or intensity of reflected light or transmitted light.

Thus, the optical device 30 of the second embodiment includes two low refractive index layers 23 having a light absorbing function in the UV region, and therefore, light in the UV region can be absorbed in each of the two resonant structures 31A, 31B. Accordingly, even when incident light contains light with the wavelength of the UV region, transmitted light of the optical device 30 is preferably prevented from containing light in the UV region. In other words, the UV light shielding function can be enhanced in the optical device 30, compared to the first embodiment.

Furthermore, in the case of the mode in which the wavelength ranges enhanced and reflected by the grating regions 13, 15 contain the wavelength range of the UV region, the UV light shielding function can be further enhanced in the optical device 30.

It should be noted that, as in the first embodiment, each top region 17 may cancel light in wavelength ranges different from the wavelength range of light desired to be extracted, among the light caused by reflection or interference in regions located further to the rear side than the top region 17, so that the light in the different wavelength ranges is prevented from emerging from the front side of the optical device 30. Specifically, it is preferred that the thickness and the material of the low refractive index layers 23 and the material of the boundary low refractive index region 18 are selected so that the top regions 17 can cancel light other than in the wavelength ranges enhanced by the grating regions 13, 15.

[Method of Producing Optical Device]

Figure 11:
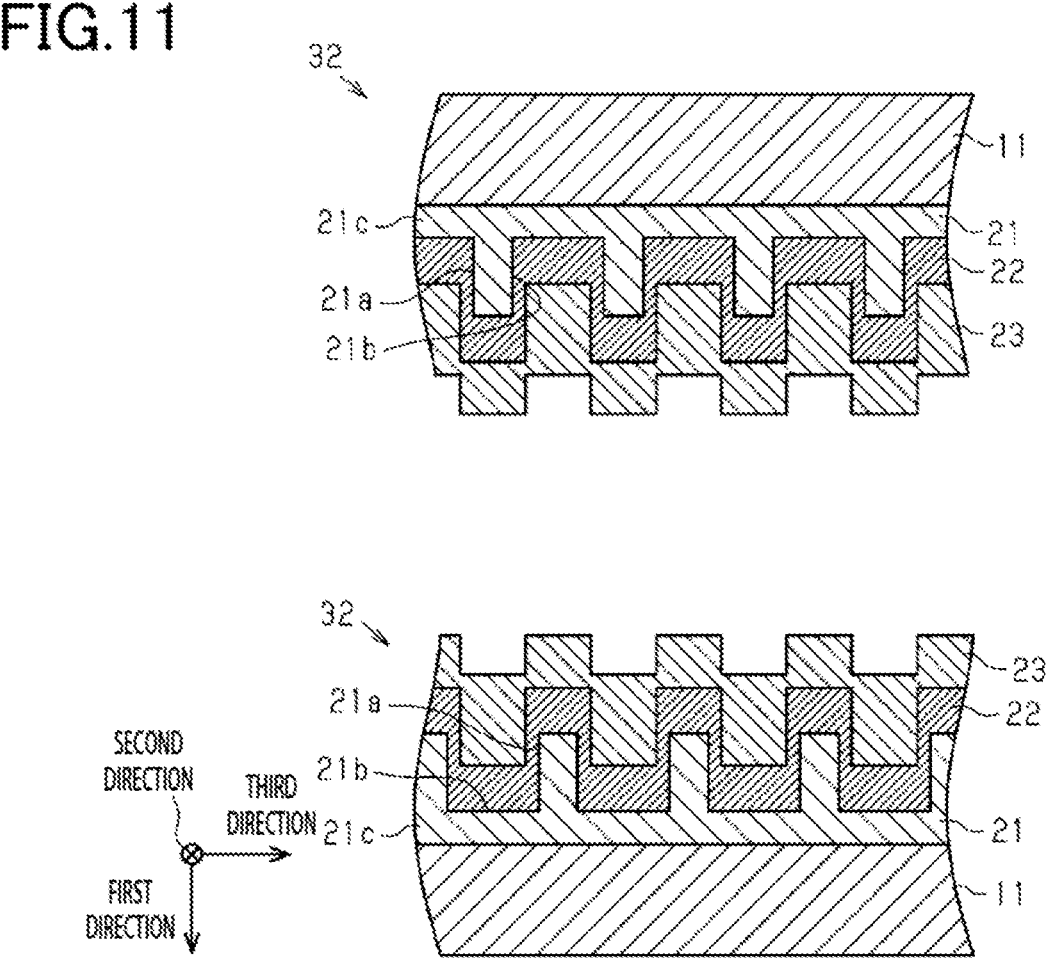
FIG. 11 is a diagram illustrating a state in which concavo-convex structures face each other in a method of producing an optical device according to the second embodiment.
Figure 12:
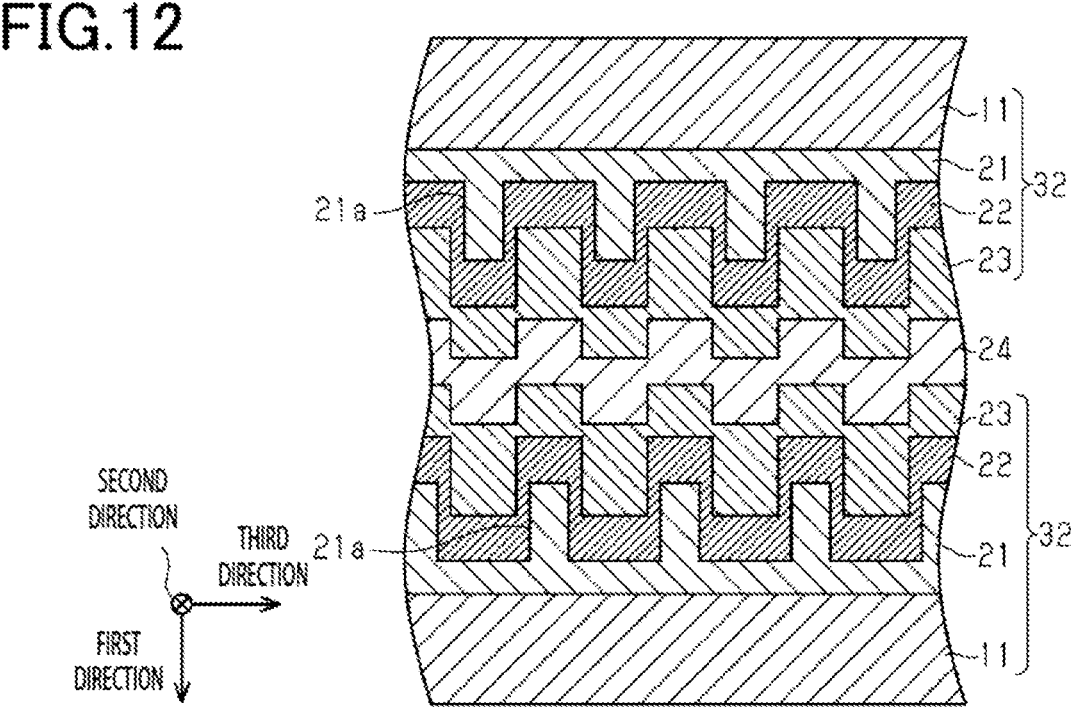
FIG. 12 is a diagram illustrating a step of forming an embedded layer in the method of producing an optical device according to the second embodiment.

Referring to FIGS. 11 and 12, a method of producing the optical device 30 of the second embodiment will be described. First, when producing the optical device 30 of the second embodiment, a concavo-convex structure layer 21, a high refractive index layer 22, and a low refractive index layer 23 are sequentially formed on each substrate 11, as in the first embodiment.

Subsequently, as shown in FIG. 11, two concavo-convex structures 32, each being a structure including a substrate 11, a concavo-convex structure layer 21, a high refractive index layer 22, and a low refractive index layer 23, are placed so that the low refractive index layers 23 face each other and then, as shown in FIG. 12, a low refractive index material is filled in the region between the two concavo-convex structures 32 to bond these concavo-convex structures 32 together. This is the way an optical device 30 is formed.

As shown in FIG. 12, with the low refractive index material being filled in, an embedded layer 24 is formed between the two concavo-convex structures 32. The embedded layer 24 is formed of the second top low refractive index portions 17b in the top region 17 of the first resonant structure 31A, the second top low refractive index portions 17b in the top region 17 of the second resonant structure 31B, and the boundary low refractive index region 18.

The low refractive index material of the embedded layer 24 is a material having a refractive index lower than that of the high refractive index material of the high refractive index layers 22, and is preferred to be a resin material, such as a UV curable resin, thermoplastic resin, and thermosetting resin. For example, the embedded layer 24 may be formed of a material that is the same as the material of the concavo-convex structure layers 21. As the method of forming the embedded layer 24, various coating methods may be used.

It should be noted that, in the state in which the two concavo-convex structures 32 face each other, the first top low refractive index portions 17a of one concavo-convex structure 32 may face the respective first top low refractive index portions 17a of the other concavo-convex structure 32, or the first top low refractive index portions 17a of one concavo-convex structure 32 may face the respective second top low refractive index portions 17b of the other concavo-convex structure 32. Alternatively, the first top low refractive index portions 17a of one concavo-convex structure 32 may face part of the respective first top low refractive index portions 17a and part of the respective second top low refractive index portions 17b of the other concavo-convex structure 32.

For example, if two concavo-convex structures 32, in which the convexities 21a in both structures have the same period, are bonded together, there can be formed an optical device 30 in which the two resonant structures 31A, 31B have the same structural period Pk. Also, for example, if two concavo-convex structures 32, in which the convexities 21a in one structure have a period different from the period in the other structure, are bonded together, there can be formed an optical device 30 in which the two resonant structures 31A, 31B have structural periods Pk different from each other.

It should be noted that the two resonant structures 31A, 31B may be arranged so that the top regions 17 are located on the outside, instead of the arrangement in which the top regions 17 are located on the inside facing each other. In other words, the two concavo-convex structures 32 may be bonded via a low refractive index material so that the substrates 11 face each other on the inside.

Alternatively, the two resonant structures 31A, 31B may be arranged so that the top regions 17 are both oriented to the front side. In other words, the two concavo-convex structures 32 may be bonded via a low refractive index material so that the top region 17 of one concavo-convex structure 32 faces the substrate 11 of the other concavo-convex structure 32.

With the configuration in which the top regions 17 are located on the outermost surfaces of the optical device 30, the top regions 17 can exert the effect of minimizing surface reflection as in the first embodiment.

Furthermore, the optical device 30 may include three or more resonant structures 31 arranged in the first direction. As the number of the resonant structures 31 increases in the optical device 30, absorptivity of light in the UV region can be enhanced accordingly. In the mode in which the optical device 30 includes a plurality of resonant structures 31, if the structural period Pk is the same between these resonant structures 31, the intensity of reflected light can be enhanced as the number of the resonant structures 31 increases. Furthermore, a plurality of resonant structures 31 may include those which have the same structural period Pk and those which have different structural periods Pk from each other. With such structures, the wavelength range of reflected light or transmitted light emerging from the optical device 30 can be finely controlled.

When producing an optical device 30 including three or more resonant structures 31, the substrates 11 and the concavo-convex structure layers 21 may be made of materials with which each substrate 11 can be peeled from the corresponding concavo-convex structure layer 21, so that, when laminating the concavo-convex structures 32 with each other, the substrates 11 can be peeled away. For example, after bonding two concavo-convex structures 32 together via a low refractive index material so that the top regions 17 face each other on the inside, the substrate 11 of one structure may be peeled away, followed by bonding another concavo-convex structure 32 to the exposed concavo-convex structure layer 21 via a low refractive index material, and this bonding may be repeated so that an optical device 30 including six or more sub-wavelength gratings can be formed.

As in the application example shown in the first embodiment, the optical device 30 of the second embodiment may be applied to filters included in display devices and the like, or may be applied to displays.

As described above, according to the second embodiment, the following advantageous effects can be obtained in addition to the advantageous effects (1) to (6) of the first embodiment.

(7) If the optical device 30 has a configuration in which a plurality of resonant structures 31 are arranged in the first direction, the optical device 30 will include four or more grating regions 13, 15, and therefore, wavelength selectivity of the optical device 30 can be further enhanced, or flexibility when controlling the wavelength ranges contained in reflected light and transmitted light can be enhanced. Furthermore, since the optical device 30 includes two low refractive index layers 23, the UV light shielding function can be enhanced in the optical device 30.

(8) In the case of the mode in which the structural period Pk is the same between a plurality of resonant structures 31, variation can be reduced in the wavelength range of light undergoing resonance in the grating regions 13, 15 of each resonant structure 31. Accordingly, wavelength selectivity for reflected light can be further enhanced. Furthermore, if the ratio of the optical thickness OT2 to the optical thickness OT1 is the same between the first and second resonant structures 31A, 31B, variation in optical thickness is reduced in the four grating regions 13, 15, i.e., the wavelength ranges of light undergoing resonance in these grating regions 13, 15 become closer. Accordingly, wavelength selectivity for reflected light can be further enhanced.

(9) In the case of the mode in which the structural period Pk of the first resonant structure 31A is different from that of the second resonant structure 31B, the wavelength ranges of light undergoing resonance in the grating regions 13, 15 of the first resonant structure 31A are different from the wavelength ranges of light undergoing resonance in the grating regions 13, 15 of the second resonant structure 31B. Accordingly, flexibility is enhanced when controlling the wavelength ranges of reflected light or transmitted light.

(10) The optical device 30 is formed by locating two concavo-convex structures 32 so as to face each other and filling the region between the two concavo-convex structures 32 with a low refractive index material. Accordingly, an optical device 30 including a plurality of resonant structures 31 can be easily formed.

Third Embodiment

Figure 13:
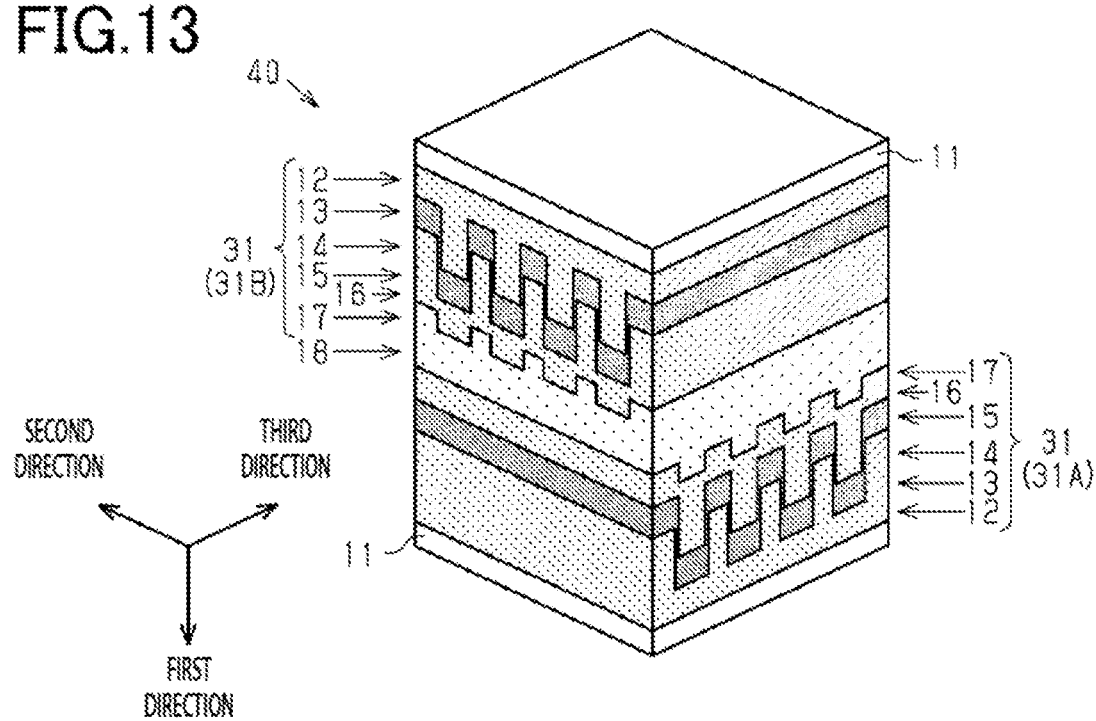
FIG. 13 is a diagram illustrating a part of a cross-sectional structure of an optical device according to a third embodiment.

Referring to FIG. 13, a third embodiment of the optical device and the method of producing an optical device will be described. The third embodiment is different from the second embodiment in the array direction of the sub-wavelength gratings in two resonant structures. The following description is focused on differences between the third and second embodiments, and therefore components similar to the second embodiment are designated with like reference signs to omit repeated explanation. It should be noted that FIG. 13 shows part of an optical device, in which the concavo-convex structure layer 21, the high refractive index layer 22, the low refractive index layer 23, and the embedded layer 24 are shown using dots with different densities, for ease of understanding the structure of the optical device.

[Optical Device]

As shown in FIG. 13, an optical device 40 of the third embodiment includes two resonant structures 31A, 31B adjacent to each other in the first direction, as in the second embodiment. However, in the third embodiment, the extension direction of the grating elements, i.e., the grating high refractive index portions 13a, 15a and the grating low refractive index portions 13b, 15b, in the grating regions 13, 15 of the first resonant structure 31A is different from the extension direction of the grating elements in the grating regions 13, 15 of the second resonant structure 31B. In other words, the array direction of the sub-wavelength gratings of the first resonant structure 31A is different from the array direction of the sub-wavelength gratings of the second resonant structure 31B.

The period, as a structural period Pk, in the array of the convexities 21a in the first resonant structure 31A is the same as the period, as a structural period Pk, in the array of the convexities 21a in the second resonant structure 31B. If high wavelength selectivity for reflected light is to be emphasized, the ratio of the optical thickness OT2 of the second grating region 15 to the optical thickness OT1 of the first grating region 13 is preferred to be 0.5 or more and 2.0 or less, and more preferred to be 0.625 or more and 1.6 or less in each of the first and second resonant structures 31A and 31B. Furthermore, the above ratio is preferred to be the same between the first and second resonant structures 31A, 31B.

The grating high refractive index portions 13a, 15a and the grating low refractive index portions 13b, 15b of the first resonant structure 31A extend in the second direction and are arranged in the third direction. On the other hand, the grating high refractive index portions 13a, 15a and the grating low refractive index portions 13b, 15b of the second resonant structure 31B extend in the third direction and are arranged in the second direction. Specifically, the extension direction of the grating elements of the first resonant structure 31A is orthogonal to the extension direction of the grating elements of the second resonant structure 31B. In other words, an angle of 90° is formed between the array direction of the sub-wavelength gratings of the first resonant structure 31A and the array direction of the sub-wavelength gratings of the second resonant structure 31B.

[Operation of Optical Device]

As described above, in the case where sub-wavelength gratings are formed of the grating high refractive index portions 13a, 15a extending in strips in one direction, light polarized in a specific direction undergoes resonance in the grating regions 13, 15 as a result of multiple reflection, and emerges as reflected light. The specific direction depends on the array direction of the sub-wavelength gratings. Due to the difference in array direction of the sub-wavelength gratings between the first and second resonant structures 31A, 31B, the polarizing direction of light reflected in multiple manner is different between the grating regions 13, 15 of the first resonant structure 31A and the grating regions 13, 15 of the second resonant structure 31B. Thus, according to the optical device 40 of the third embodiment, reflected light can be efficiently outputted for incident light containing polarization components in various directions, and therefore, the intensity of reflected light can be further enhanced.

[Method of Producing Optical Device]

As in the second embodiment, the optical device 40 of the third embodiment is formed by placing two concavo-convex structures 32 so that the top regions 17 face each other on the inside and filling the region between the two concavo-convex structures 32 with a low refractive index material. However, in the third embodiment, the concavo-convex structures 32 are placed face-to-face and bonded together via a low refractive index material, so that the extension direction of the convexities 21a of one concavo-convex structure 32 is orthogonal to the extension direction of the convexities 21a of the other concavo-convex structure 32.

It should be noted that, as in the second embodiment, the two resonant structures 31A, 31B may be arranged so that the top regions 17 thereof are located on the outside, or may be arranged so that the top regions 17 thereof are both oriented to the front side.

Furthermore, the optical device 40 may include three or more resonant structures 31 arranged in the first direction, and the plurality of resonant structures 31 in this case may need to include grating elements whose extension direction is different between the resonant structures 31. Such an optical device 40 includes an even number of, i.e., 2n (n is an integer that is 3 or greater), sub-wavelength gratings in which the array direction and the array period are the same between a (2m−1)th (m is an integer that is 1 or greater and n or smaller) sub-wavelength grating and a (2m)th sub-wavelength grating from the front side or the rear side. In other words, the optical device 40 has a structure in which pairs of sub-wavelength gratings, each pair having the same array direction and array period, are arranged in the first direction and these sub-wavelength gratings are embedded in a low refractive index material.

With this configuration, polarization response of the optical device 40 can be controlled according to the setting of array direction of the sub-wavelength gratings of each resonant structure 31, the setting of the number of resonant structures 31 with the same array direction of the sub-wavelength gratings, and the like. As the number of the resonant structures 31 increases in the optical device 40, absorptivity of light in the UV region can be enhanced therein. It should be noted that the plurality of resonant structures 31 may include those which are mutually different in array period of the sub-wavelength gratings.

As in the application example shown in the first embodiment, the optical device 40 of the third embodiment may be applied to filters included in display devices and the like, or may be applied to displays. If the optical device 40 of the third embodiment is used targeting incident light containing polarization components in various directions, a strong effect of efficiently outputting reflected light can be achieved for polarized light. On the other hand, if incident light with uniform polarization direction is targeted, the optical device 30 of the second embodiment is preferred to be applied thereto.

As described above, according to the third embodiment, the following advantageous effects can be obtained in addition to the advantageous effects (1) to (6) of the first embodiment and the advantageous effects (7), (8) and (10) of the second embodiment.

(11) Since the direction in which the grating elements extend is different between the first and second structures 31A, 31B, light polarized in different directions among the light contained in the incident light produces resonance in the grating regions 13, 15 of the first resonant structure 31A and in the grating regions 13, 15 of the second grating structure 31B, and emerges from the respective resonant structures 31. Thus, reflected light can be efficiently outputted for the incident light containing polarization components in various directions.

Fourth Embodiment

Referring to FIGS. 14A to 14D, a fourth embodiment of the optical device and the method of producing an optical device will be described. The fourth embodiment is different from the first embodiment in the array of the sub-wavelength gratings. The following description is focused on differences between the fourth and first embodiments, and therefore components similar to the first embodiment are designated with like reference signs to omit repeated explanation.

As shown in FIGS. 14A to 14D, the sub-wavelength gratings in an optical device 50 of the fourth embodiment have a two-dimensional grid array.

Figure 14A:
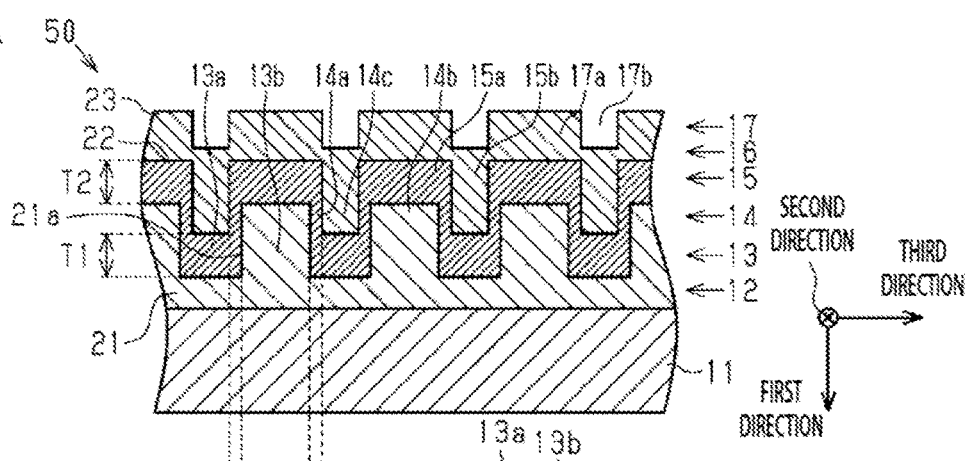
Figure 14B:
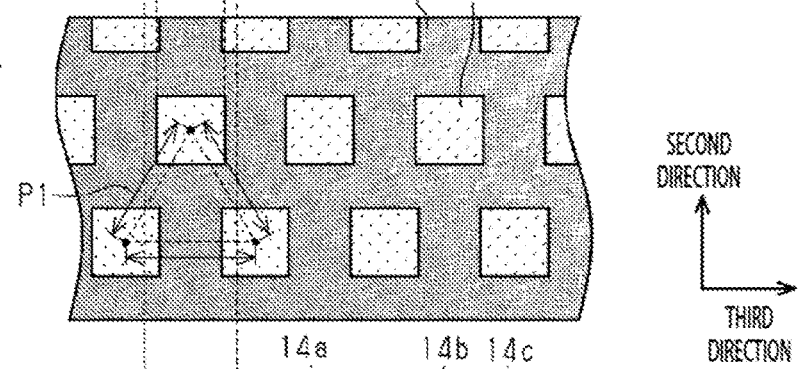

Specifically, as shown in FIG. 14B, the plurality of first grating low refractive index portions 13b are arranged in a two-dimensional grid in the first grating region 13. The type of the two-dimensional grid is not particularly limited, but the two-dimensional grid may only need to include the first grating low refractive index portions 13b each located at a grid point of a grid square defined by two intersecting parallel-line groups extending in different directions. For example, the two-dimensional grid configured by the first grating low refractive index portions 13b may be a square grid or a hexagonal grid. The period, as a first period P1, of the grating structure in the first grating region 13 is the same between the directions in which the two-dimensional grid extends. The first grating high refractive index portion 13a fills in between the plurality of first grating low refractive index portions 13b, forming one continuous high refractive index portion.

As viewed in the first direction, the shape of each first grating low refractive portion 13b is not particularly limited; however, if the shape is square, for example, it will be easy to determine the area ratio that defines an average refractive index of the first grating region 13.

Figure 14C:
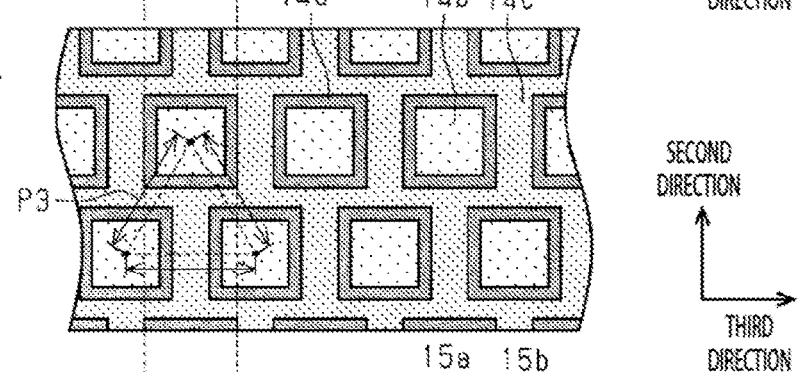

Specifically, as shown in FIG. 14C, the plurality of first intermediate low refractive index portions 14b in the intermediate region 14b are arranged in a two-dimensional grid matching that of the first grating low refractive index portions 13b. The array period, as a third period P3, of the first intermediate low refractive index portions 14b in the intermediate region 14, matches the first period P1 in the first grating region 13. As viewed in the first direction, the size of each first intermediate low refractive index portion 14b matches the size of each first grating low refractive index portion 13b.

As viewed in the first direction, each of the intermediate high refractive index portions 14a has a frame shape and encloses the corresponding one of the first intermediate low refractive portions 14b. The second intermediate low refractive index portion 14c fills in between adjacent intermediate high refractive index portions 14a, forming one continuous low refractive index portion.

Figure 14D:
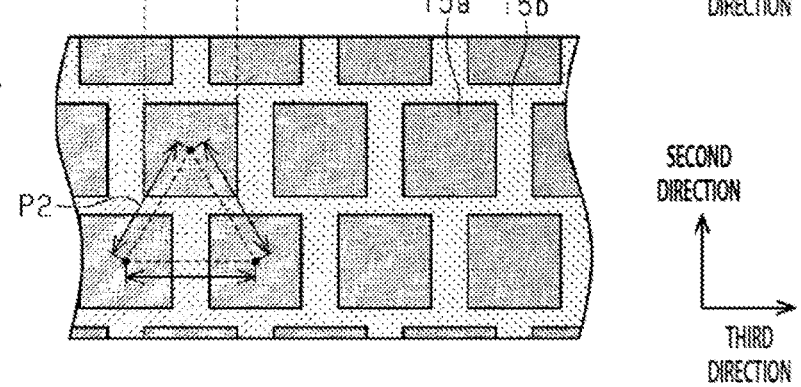

As shown in FIG. 14D, the plurality of second grating high refractive index portions 15a in the second grating region 15 are arranged in a two-dimensional grid matching that of the first grating low refractive index portions 13b. The second grating high refractive index portion 15b fills in between the plurality of second grating high refractive index portions 15a, forming one continuous low refractive index portion. The period, as a second period P2, of the grating structure in the second grating region 15 matches the first period P1 in the first grating region 13.

However, as viewed in the first direction, the size of each of the second grating high refractive index portions 15a shown as dotted in the second grating region 15 is larger than the size of each of the first grating low refractive index portions 13b shown as dotted in the first grating region 13. In other words, in the second and third directions, the width of each second grating high refractive index portion 15a is larger than the width of each first grating low refractive index portion 13b. Accordingly, the width of the second grating low refractive index portion 15b is smaller than the width of the first grating high refractive index portion 13a. As viewed in the first direction, each second grating high refractive index portion 15a has a shape similar to that of each first grating low refractive index portion 13b.

The plurality of first top low refractive index portions 17a in the top region 17 are also arranged in a two-dimensional grid matching that of the first grating low refractive index portions 13b. Furthermore, the second top low refractive index portion 17b fills in between the plurality of first top low refractive index portions 17a, forming one continuous low refractive index portion. The array period of the first top low refractive index top portions 17a in the top region 17 matches the first period P1 in the first grating region 13.

In the optical device 50 of the fourth embodiment, a guided mode resonance phenomenon also occurs due to the same principles as in the first embodiment, so that light in the wavelength range enhanced in the first grating region 13 and light in the wavelength range enhanced in the second grating region 15 emerge as reflected light. Thus, light in the UV region that has been absorbed by the low refractive index layer 23 and has passed through the regions in the optical device 50 emerges as transmitted light.

In the fourth embodiment, the optical thickness OT1 of the first grating region 13 is also calculated using Formula (2) shown in the first embodiment, and the optical thickness OT2 of the second grating region 15 is calculated using Formula (4) shown in the first embodiment. Thus, if the ratio of the optical thickness OT2 of the second grating region 15 to the optical thickness OT1 of the first grating region 13 is 0.5 or more and 2.0 or less, and more preferably 0.625 or more and 1.6 or less, good wavelength selectivity for reflected light can be achieved in the optical device 50.

In the fourth embodiment, it is also preferred that the area ratio R3 of the intermediate high refractive index portions 14a satisfies Formula (5) shown in the first embodiment. If Formula (5) is satisfied, the width of each intermediate high refractive index portion 14a can be reduced so that the intermediate high refractive index portion 14a does not extend outside the corresponding second grating high refractive index portion 15a, and therefore, the area ratio of the intermediate high refractive index portions 14a is prevented from becoming excessively high. Accordingly, the intensity of the reflected light from the grating regions 13, 15 becomes preferable.

As in the fourth embodiment, as long as the mode is one in which the grating elements of the sub-wavelength gratings are arranged in a two-dimensional grid, light that is polarized in different directions can undergo resonance for each direction in which the grating elements are arranged. Thus, as in the first embodiment, reflected light can be efficiently outputted for incident light containing polarization components in various directions, compared to the mode in which the grating elements are arranged in only one direction. Therefore, the intensity of reflected light can be further enhanced.

In particular, if the mode is one in which the grating elements are arranged in a hexagonal grid, the number of directions of polarized light that can undergo resonance in the grating regions increases compared to the mode in which the grating elements are arranged in a square grid, and therefore, reflected light can be more efficiently outputted for incident light containing polarization components in various directions.

The optical device 50 of the fourth embodiment can be produced by changing the array of the convexities 21a in the method of producing the optical device 10 of the first embodiment. Specifically, the concavo-convex structure layer 21 can be formed by forming a concavo-convex structure in which a plurality of convexities 21a are arranged in a two-dimensional grid. The plurality of convexities 21a are separated from each other, and a concavity 21b located between the convexities 21a forms one continuous concavity. If the mode is one in which the convexities 21a are arranged in a two-dimensional grid as in the fourth embodiment, the convexities 21a have high flexibility in size and position, and thus, fine adjustment is easy when determining the area ratio between the convexities 21a and the concavity 21b.

The modifications of the optical device 10 of the first embodiment can be applied to the optical device 50 of the fourth embodiment. Furthermore, the optical device 50 of the fourth embodiment may be applied to the second and third embodiments. Specifically, a plurality of optical devices 50 may be laminated in the first direction to configure an optical device including four or more grating regions. In this case, the directions in which the grating elements of the sub-wavelength gratings are arranged, or in other words, the directions in which the two-dimensional grid extends, may be the same or different from each other between the two or more resonant structures 31. In a configuration in which the two-dimensional grids of two resonant structures 31 are different in extension direction, reflected light can be outputted for polarized light according to an increased number of polarization directions.

It should be noted that the periods of the grating structures in the grating regions 13, 15 may depend on the directions in which the two-dimensional grids extend. With this configuration, the wavelength range undergoing resonance can be changed depending on the direction in which the two-dimensional grid extends to thereby control responsiveness to the wavelength range contained in reflected light or to polarized light.

Furthermore, the concavo-convex structure of the concavo-convex structure layer 21 may be formed of a plurality of concavities separated from each other and one convexity continuous between the concavities. Specifically, the concavo-convex structure of the concavo-convex structure layer 21 may need to be formed of a plurality of concavo-convex elements, which are convexities or concavities, separated from each other and arranged in a two-dimensional grid.

As in the application example shown in the first embodiment, the optical device 50 of the fourth embodiment may be applied to filters included in display devices and the like, or may be applied to displays.

As described above, according to the fourth embodiment, the following advantageous effects can be obtained in addition to the advantageous effects (1) to (6) of the first embodiment.

(12) Since the grating elements of the sub-wavelength gratings are arranged in a two-dimensional grid, reflected light can be efficiently outputted for the incident light containing polarization components in various directions.

Modifications

The embodiments described above can be modified and implemented as follows.

A layer different from the low refractive index layer 23 may have absorptivity for light in the UV region as long as the layer is made of a low refractive index material. For example, the concavo-convex structure layer 21 or the substrate 11 may have absorptivity for light in the UV region. Furthermore, in the second and third embodiments, the embedded layer 24 may have absorptivity for light in the UV region. These layers having absorptivity for light in the UV region may need to be made of, for example, a resin to which a UV absorber is added.

If light in the UV region is extracted as reflected light enhanced in the grating regions 13, 15, the optical device may need to be used such that light is incident on the grating regions 13, 15 from the side opposite to the side provided with the layer having absorptivity for light in the UV region. For example, if the concavo-convex structure layer 21 or the substrate 11 has absorptivity for light in the UV region, light may need to be incident on the side at which the top region 17 is provided, in the first and fourth embodiments. In the second and third embodiments, the concavo-convex structure layer 21 or the substrate 11 in one of the two resonant structures 31 may need to have absorptivity for light in the UV region, and light may need to be incident on the side where the other resonant structure 31 is located. If the embedded layer 24 has absorptivity for light in the UV region, light may be incident on either side.

As long as the mode is one in which any one of the substrate 11, the concavo-convex structure layer 21, the low refractive index layer 23, and the embedded layer 24 has absorptivity for light in the UV region, the layers required of the optical device, which produce a guided mode resonance phenomenon in two or more grating regions, are imparted with absorptivity for light in the UV region. Therefore, compared to the case where the optical device has no absorptivity for light in the UV region, an optical device having a UV light shielding function can be formed without increasing the number of layers forming the optical device, and therefore, the load of producing optical devices can be prevented from increasing.

Figure 15:
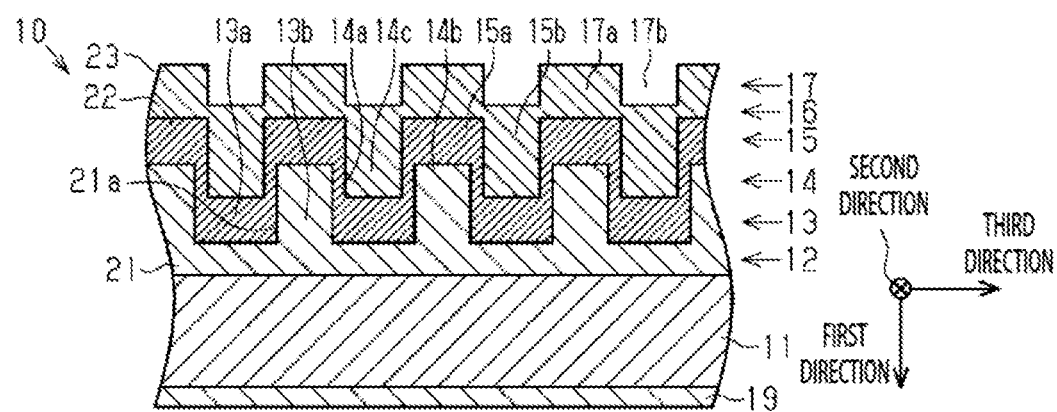
FIG. 15 is a diagram illustrating a cross-sectional structure of a modification of the optical device according to the first embodiment.

Other than the layers described above, the optical device may include a layer having absorptivity for light in the UV region. For example, as shown in FIG. 15, the optical device 10 of the first embodiment may include an absorption layer 19 which is provided to the substrate 11 so as to be in contact with the surface thereof facing away from the surface provided with the concavo-convex structure layer 21. The absorption layer 19 has absorptivity for light in the UV region. The absorption layer 19 may be formed, for example, using several coating methods and using a resin to which a UV absorber is added. If the optical device includes two resonant structures 31 as in the second and third embodiments, an absorption layer having absorptivity for light in the UV region may be laminated on the substrate 11 contacting one resonant structure 31.

With the above configuration, if light in the UV region is extracted as reflected light enhanced in the grating regions 13, 15, light may also need to be incident on the grating regions 13, 15 from the side opposite to the side provided with the layer having absorptivity for light in the UV region.

If the light shielding function in the optical device is achieved by providing a layer dedicated to absorbing light in the UV region as does the absorption layer 19 described above, the following advantageous effects can be achieved. Specifically, the materials and the thicknesses of the layers can be more suitably selected for the respective layers, than in the case where the layer having absorptivity for light in the UV region also serves as a layer having another function, e.g., a function of producing a guided mode resonance phenomenon.

As described above, the layers configuring the optical device may only need to include a layer having absorptivity for light in the UV region. The layer having absorptivity for light in the UV region has higher absorptivity for light in the UV region than a UV curable resin after being cured.

The layers configuring the optical device described above may need to have absorptivity for light in a predetermined wavelength range, and further, the wavelength range targeted to absorption does not necessarily have to be the UV region. As long as the optical device includes a layer having absorptivity for light in the predetermined wavelength range, the optical device has a light shielding function in this wavelength range. Accordingly, the optical device can be used as a filter or the like for a device in which this wavelength range is desired to be shielded against.

In each of the embodiments described above, the intermediate region 14 of the optical device does not necessarily have to include the intermediate high refractive index portions 14a. Specifically, the intermediate region 14 may be formed of the first intermediate low refractive index portions 14b and the second intermediate low refractive index portions 14c. Depending on the conditions for preparing the high refractive index layer 22, an optical device having no intermediate high refractive index portions 14a, i.e., an optical device without having segments of the high refractive index layer 22 formed on the side faces of the convexities 21a can be prepared.

In the mode in which the top region 17 is located on the outermost surface, a protective layer covering the top region 17 may be provided. In this case, the protective layer may be made of a low refractive index material such as a resin, and the concavities of the low refractive index layer 23 may be filled with the protective layer. In other words, the second top low refractive index portions 17b may be filled with the low refractive index material.

In the second and third embodiments, an embedded layer 24 serving as a low refractive index layer may be filled in between the high refractive index layer 22 of the first resonant structure 31A and the high refractive index layer 22 of the second resonant structure 31B. In this case, the resonant structures 31 will have no top regions 17, and thus, the second low refractive index region 16 of the first resonant structure 31A will be continuous to the second low refractive index region 16 of the second resonant structure 31B with no boundary therebetween.

What is claimed is:

1. An optical device, comprising
   a concave-convex structure layer having a concavo-convex structure on a surface thereof, the concavo-convex structure being formed of either a plurality of convexities or a plurality of concavities which are arranged with a sub-wavelength period;
   a high refractive index layer located on the concavo-convex structure and having a surface conforming to the concavo-convex structure, the high refractive index layer including first grating high refractive index portions located at a bottom of the concavo-convex structure and forming a first sub-wavelength grating and second grating high refractive index portions located at a top of the concavo-convex structure and forming a second sub-wavelength grating, the high refractive index layer being made of a material having a refractive index higher than that of the concavo-convex structure layer; and
   a low refractive index layer located on the high refractive index layer and made of a material having a refractive index lower than that of the high refractive index layer, wherein
   either of the concavo-convex structure layer and the low refractive index layer has absorptivity for light in a predetermined wavelength range; or
   the optical device includes an additional layer having absorptivity for light in the predetermined wavelength range, wherein
   when T1 represents a thickness of the first grating high refractive index portions, T2 represents a thickness of the second grating high refractive index portions, n1 represents a refractive index of a material of the high refractive index layer, n2 represents a refractive index of a material of the concavo-convex structure layer, n3 represents a refractive index of a material of the low refractive index layer, R1 represents an area ratio of the first grating high refractive index portions in a cross section including the first grating high refractive index portions and orthogonal to a thickness direction thereof, and R2 represents an area ratio of the second grating high refractive index portions in a cross section including the second grating high refractive index portions and orthogonal to a thickness direction thereof,
   relations n1>n2, n1>n3, and R1+R2>1 are established; and
   a ratio of a second parameter expressed by T2×{n1×R2+n3×(1−R2)} to a first parameter expressed by T1×{n1×R1+n2×(1−R1)} is 0.5 or more and 2.0 or less.

2. The optical device of claim 1, wherein
   the light in the predetermined wavelength range is light in the UV region.

3. The optical device of claim 2, wherein
   at least either of reflected light which is outputted being enhanced by a guided mode resonance phenomenon occurring in a region including the first grating high refractive index portions, and reflected light which is outputted being enhanced by a guided mode resonance phenomenon occurring in a region including the second grating high refractive index portions, contains light in the UV region.

4. The optical device of claim 1, wherein
   the low refractive index layer has absorptivity for light in the predetermined wavelength range.

5. The optical device of claim 1, wherein
   the concavo-convex structure layer has absorptivity for light in the predetermined wavelength range.

6. The optical device of claim 1, comprising
   the additional layer, wherein
   the additional layer is a substrate supporting the concavo-convex structure layer.

7. The optical device of claim 1, comprising
   a substrate supporting the concavo-convex structure layer; and
   the additional layer, wherein
   the additional layer is located on a surface of the substrate facing away from a surface where the concavo-convex structure layer is provided.

8. The optical device of claim 1, wherein
   the low refractive index layer has a surface conforming to asperities of a surface of the high refractive index layer.

9. The optical device of claim 1, wherein
   the high refractive index layer includes intermediate high refractive index portions extending over respective side faces of the plurality of convexities or the plurality of concavities between the first grating high refractive index portions and the second grating high refractive index portions; and
   when R3 represents an area ratio of the intermediate high refractive index portions in a cross section including the intermediate high refractive index portions and orthogonal to a thickness direction thereof, a relation R3≤R1+R2−1 is satisfied.

10. The optical device of claim 1, wherein
    a part including the concavo-convex structure layer, the high refractive index layer, and the low refractive index layer forms a resonant structure; and
    the optical device includes
    a plurality of the resonant structures arranged in a thickness direction thereof, and
    the additional layer, wherein
    the additional layer fills in between the resonant structures adjacent to each other, the additional layer being made of a material having a refractive index lower than that of the high refractive index layer.

* * * * *